US010918020B2

(12) United States Patent
Jones et al.

(10) Patent No.: US 10,918,020 B2
(45) Date of Patent: Feb. 16, 2021

(54) BALER AND ACCUMULATOR CONTROL SYSTEM

(71) Applicant: Deere & Company, Moline, IL (US)

(72) Inventors: Austin Jones, Ottumwa, IA (US); Sergio Miguel Valenzuela, Garza Garcia (MX)

(73) Assignee: DEERE & COMPANY, Moline, IL (US)

( * ) Notice: Subject to any disclaimer, the term of this patent is extended or adjusted under 35 U.S.C. 154(b) by 143 days.

(21) Appl. No.: 15/721,159

(22) Filed: Sep. 29, 2017

(65) Prior Publication Data

US 2018/0020621 A1 Jan. 25, 2018

Related U.S. Application Data

(63) Continuation-in-part of application No. 15/142,790, filed on Apr. 29, 2016, now Pat. No. 9,995,319.
(Continued)

(51) Int. Cl.
*A01F 15/07* (2006.01)
*A01F 15/08* (2006.01)
(Continued)

(52) U.S. Cl.
CPC ........ *A01F 15/0883* (2013.01); *A01D 85/005* (2013.01); *A01F 15/0705* (2013.01);
(Continued)

(58) Field of Classification Search
CPC .. A01F 15/07; A01F 15/0883; A01F 15/0705; A01D 85/005; F15B 11/20; B30B 9/3007
See application file for complete search history.

(56) References Cited

U.S. PATENT DOCUMENTS 3,139,196 A 6/1964 Legocki
3,163,302 A 12/1964 Pridgeon
(Continued)

FOREIGN PATENT DOCUMENTS

AU 568143 12/1987
AU 2003262343 6/2005
(Continued)

OTHER PUBLICATIONS

Extended European Search Report and Search Opinion for Application No. 18152084.2 dated Apr. 16, 2018 (8 pages).
(Continued)

*Primary Examiner* — Abiy Teka
(74) *Attorney, Agent, or Firm* — Michael Best & Friedrich LLP

(57) ABSTRACT

A baler configured to execute a baling cycle to form a bale of crop material, the baler including a gate configured to move between a closed position and an open position. The system includes an accumulator coupled to the baler and having a receiving area configured to receive the bale from the baler when the gate is in the open position, and an actuator configured to direct the bale received from the baler selectively toward a first accumulation area or a second accumulation area of the accumulator. The system also includes a hydraulic circuit operatively coupled to the actuator and configured to, in a first configuration, move the actuator toward the first accumulation area and, in a second configuration, move the actuator toward the second accumulation area. A hydraulic valve is moved during the baling cycle to alternate the hydraulic circuit between the first configuration and the second configuration.

27 Claims, 17 Drawing Sheets

Related U.S. Application Data

(60) Provisional application No. 62/448,558, filed on Jan. 20, 2017, provisional application No. 62/235,456, filed on Sep. 30, 2015.

(51) Int. Cl.
*A01D 85/00* (2006.01)
*B30B 9/30* (2006.01)

(52) U.S. Cl.
CPC ...... *B30B 9/3007* (2013.01); *A01D 2085/007* (2013.01); *A01D 2085/008* (2013.01)

(56) References Cited

U.S. PATENT DOCUMENTS

| | | | |
|---|---|---|---|
| 3,402,832 A | 9/1968 | Wehde | |
| 3,587,877 A | 6/1971 | Hornibrook | |
| 3,677,348 A | 7/1972 | Boetto et al. | |
| 3,785,391 A | 1/1974 | Miller | |
| 3,945,507 A | 3/1976 | Olsen et al. | |
| 4,067,394 A | 1/1978 | Deckler | |
| 4,215,964 A | 8/1980 | Schrag et al. | |
| 4,310,275 A | 1/1982 | Hoelscher | |
| 4,341,148 A | 7/1982 | Kosarzecki | |
| 4,483,247 A | 11/1984 | Coeffic | |
| 4,488,476 A | 12/1984 | Diel et al. | |
| 4,549,840 A | 10/1985 | Ansbjer | |
| 4,710,086 A | 12/1987 | Naaktgeboren et al. | |
| 4,710,087 A | 12/1987 | Naaktgeboren et al. | |
| 4,789,289 A | 12/1988 | Wilson | |
| 4,844,675 A | 7/1989 | Strosser et al. | |
| 4,952,111 A | 8/1990 | Callahan | |
| 4,955,774 A | 9/1990 | Van Eecke et al. | |
| 4,961,679 A | 10/1990 | Van Eecke et al. | |
| 5,180,271 A | 1/1993 | Farden | |
| 5,211,345 A | 5/1993 | Siebenga | |
| 5,263,410 A | 11/1993 | Olin | |
| 5,384,436 A | 1/1995 | Pritchard | |
| 5,560,191 A | 10/1996 | Finney et al. | |
| 5,664,923 A | 9/1997 | Olin | |
| 5,842,823 A | 12/1998 | Kohnen et al. | |
| 6,053,685 A | 4/2000 | Tomchak | |
| 6,240,712 B1 | 6/2001 | Meijer | |
| 6,272,825 B1 | 8/2001 | Anderson et al. | |
| 6,425,235 B1 | 7/2002 | Spaniol et al. | |
| 6,478,523 B1 | 11/2002 | Meijer | |
| 6,537,008 B1 | 3/2003 | Haring | |
| 6,607,342 B1 | 8/2003 | Tolzin | |
| 6,807,901 B2 | 10/2004 | Bentzinger et al. | |
| 6,851,908 B2 | 2/2005 | Bergen et al. | |
| 6,892,632 B1 | 5/2005 | Viesselmann et al. | |
| 7,000,533 B2 | 2/2006 | Derscheid et al. | |
| 7,246,479 B2 | 7/2007 | Spaniol et al. | |
| 7,401,547 B2 | 7/2008 | Degen | |
| 7,472,649 B1 | 1/2009 | Derscheid et al. | |
| 7,621,709 B2 | 11/2009 | Heitz, Jr. | |
| 7,805,914 B2* | 10/2010 | Smith ................ | A01F 15/0883 100/88 |
| 7,918,158 B2 | 4/2011 | Viaud | |
| 8,152,429 B2 | 4/2012 | Rennie | |
| 8,414,240 B2 | 4/2013 | Nause | |
| 8,522,513 B2 | 9/2013 | Reijersen Van Buuren | |
| 8,567,169 B2 | 10/2013 | Spaniol et al. | |
| 8,746,137 B1 | 6/2014 | Henry et al. | |
| 8,935,979 B2 | 1/2015 | Simmons et al. | |
| 9,253,946 B2 | 2/2016 | Straeter | |
| 9,578,811 B2 | 2/2017 | Kraus et al. | |
| 9,622,420 B2* | 4/2017 | Kraus ................ | A01F 15/0883 |
| 9,877,433 B2 | 1/2018 | Kraus et al. | |
| 9,995,319 B2 | 6/2018 | Jones et al. | |
| 10,123,488 B2 | 11/2018 | Kraus et al. | |
| 10,212,886 B2 | 2/2019 | O'Brien et al. | |
| 2005/0247215 A1 | 11/2005 | Biziorek et al. | |
| 2005/0257513 A1 | 11/2005 | Smith et al. | |
| 2006/0086263 A1 | 4/2006 | Degen | |
| 2008/0141870 A1 | 6/2008 | Verhaeghe et al. | |
| 2010/0040436 A1 | 2/2010 | Bruha et al. | |
| 2012/0189417 A1 | 7/2012 | Blough | |
| 2012/0328401 A1 | 12/2012 | Sieben | |
| 2013/0089394 A1 | 4/2013 | Straeter | |
| 2014/0053527 A1 | 2/2014 | Spaniol et al. | |
| 2014/0144119 A1 | 5/2014 | Olander et al. | |
| 2015/0272007 A1 | 10/2015 | Smith | |
| 2016/0014966 A1 | 1/2016 | Kraus et al. | |
| 2016/0014967 A1* | 1/2016 | Kraus ................ | A01D 85/005 414/812 |
| 2016/0014968 A1 | 1/2016 | Kraus et al. | |
| 2016/0014969 A1 | 1/2016 | Kraus et al. | |
| 2016/0014970 A1 | 1/2016 | Kraus et al. | |
| 2016/0014971 A1 | 1/2016 | Kraus | |
| 2016/0366832 A1 | 12/2016 | Kraus et al. | |
| 2017/0089363 A1 | 3/2017 | Jones et al. | |
| 2017/0112070 A1 | 4/2017 | Kraus et al. | |
| 2017/0290266 A1 | 10/2017 | Jones | |
| 2017/0290267 A1 | 10/2017 | O'Brien et al. | |
| 2017/0290268 A1 | 10/2017 | Jones et al. | |
| 2017/0290269 A1 | 10/2017 | Jones et al. | |
| 2017/0290271 A1 | 10/2017 | Jones et al. | |
| 2018/0020621 A1 | 1/2018 | Jones et al. | |
| 2018/0035612 A1 | 2/2018 | Jones | |
| 2019/0045718 A1 | 2/2019 | Kraus et al. | |
| 2019/0183054 A1 | 6/2019 | O'Brien et al. | |

FOREIGN PATENT DOCUMENTS

| | | |
|---|---|---|
| CA | 2709397 | 5/2000 |
| DE | 2851117 | 6/1980 |
| DE | 3347220 A1 | 9/1985 |
| DE | 102006051622 A1 | 5/2008 |
| EP | 0110056 A2 | 6/1984 |
| EP | 983720 | 3/2000 |
| EP | 2870856 A1 | 5/2015 |
| EP | 2923560 | 9/2015 |
| EP | 2974589 A1 | 1/2016 |
| EP | 2974592 A1 | 1/2016 |
| EP | 2974594 A1 | 1/2016 |
| FR | 2679410 | 1/1993 |
| FR | 2679732 | 2/1993 |
| FR | 2751506 A1 | 1/1998 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2013049308 | 4/2013 |
| WO | 2014031355 | 2/2014 |

OTHER PUBLICATIONS

EP16190919.7 Extended European Search Report dated Jan. 27, 2017 (9 pages).
European Patent Office Search Report and Written Opinion for Application No. 15176510.4 dated Dec. 14, 2015 (4 pages).
Extended European Search Report for Application No. 17164303.4 dated Sep. 18, 2017 (6 pages).
Extended European Search Report for Application No. 17164319.0 dated Sep. 21, 2017 (6 pages).
Extended European Search Report for Application No. EP17163892.7 dated Sep. 4, 2017 (7 pages).
Extended European Search Report for Application No. EP17164283.8 dated Sep. 4, 2017 (7 pages).
Extended European Search Report for Application No. EP17164310.9 dated Sep. 15, 2017 (6 pages).
United States Patent Office Action for U.S. Appl. No. 14/332,827 dated Jul. 12, 2019 (8 pages).
United States Patent Office Action for U.S. Appl. No. 14/332,827 dated May 9, 2018 (8 pages).
United States Patent Office Action for U.S. Appl. No. 14/332,827 dated Nov. 27, 2018 (10 pages).

(56) References Cited

OTHER PUBLICATIONS

United States Patent Office Action for U.S. Appl. No. 14/332,827 dated Oct. 2, 2017 (12 pages).

* cited by examiner

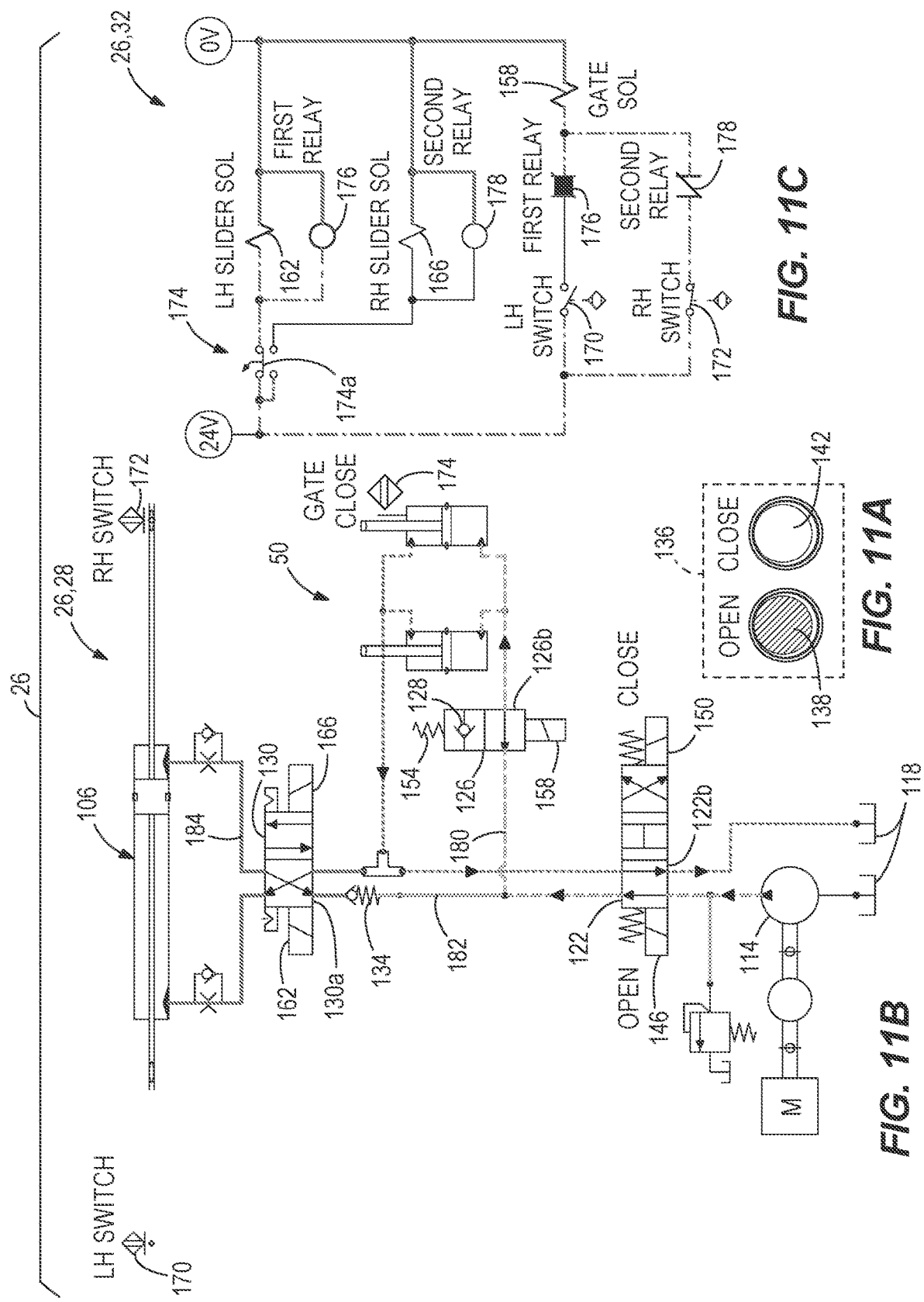

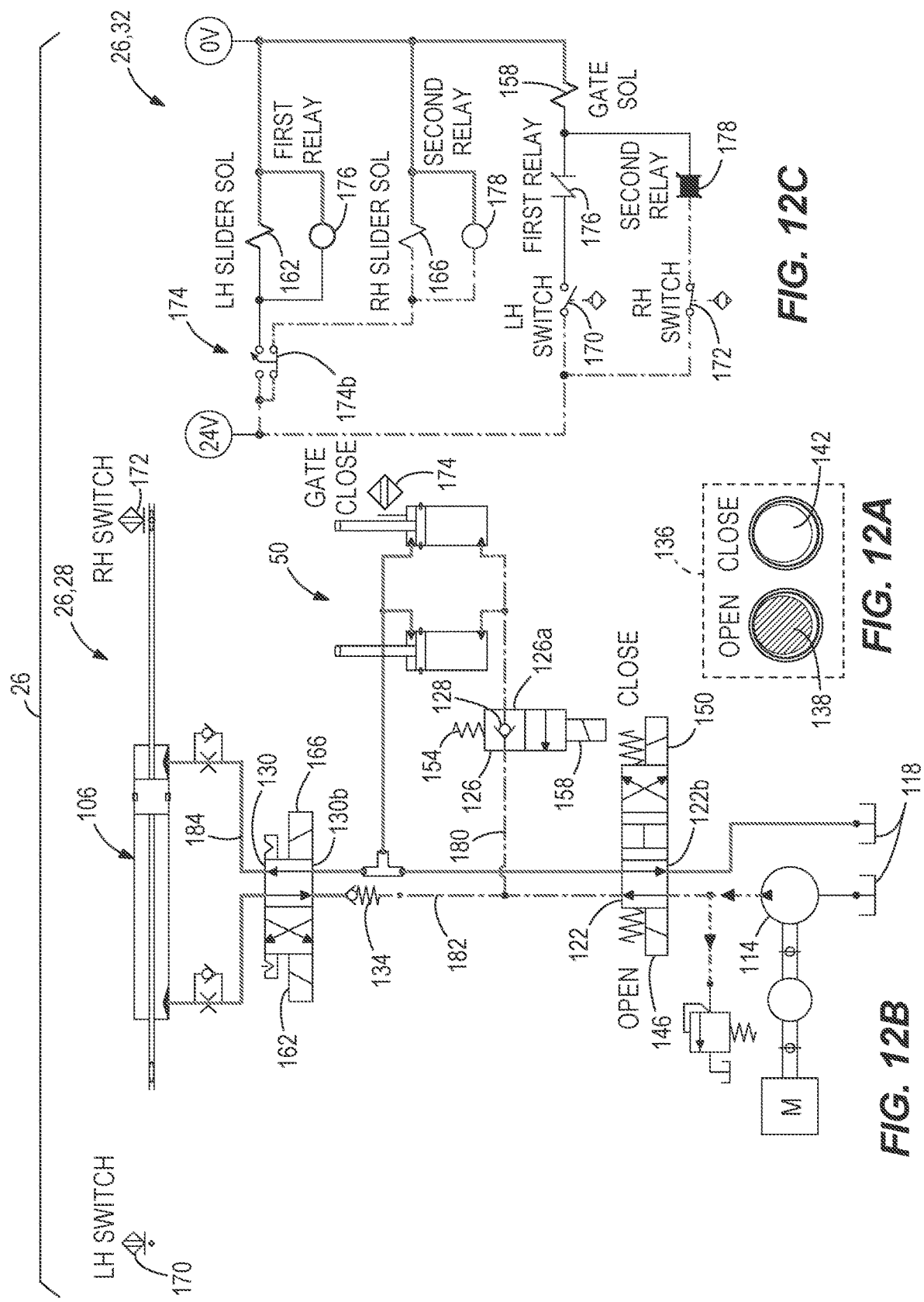

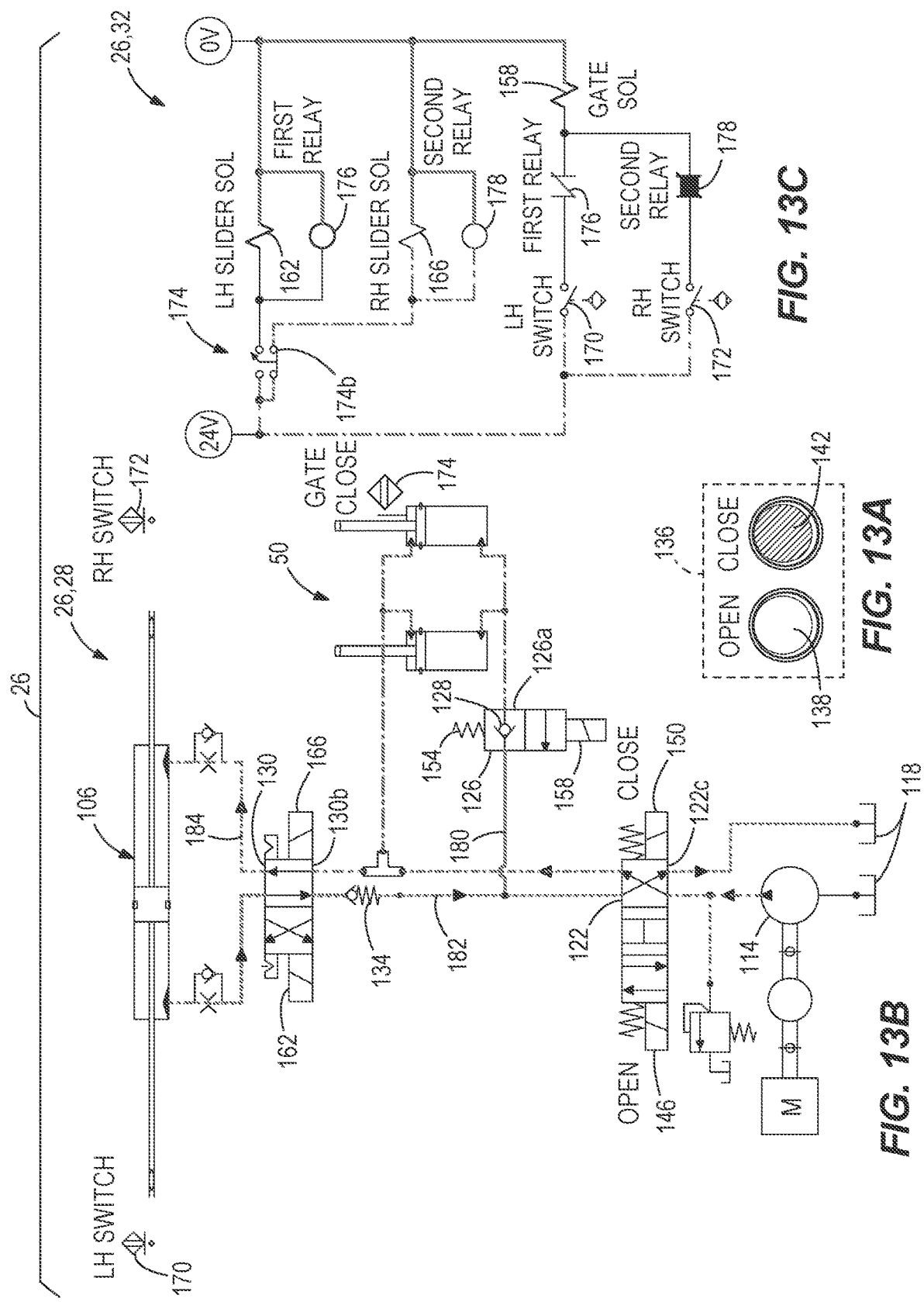

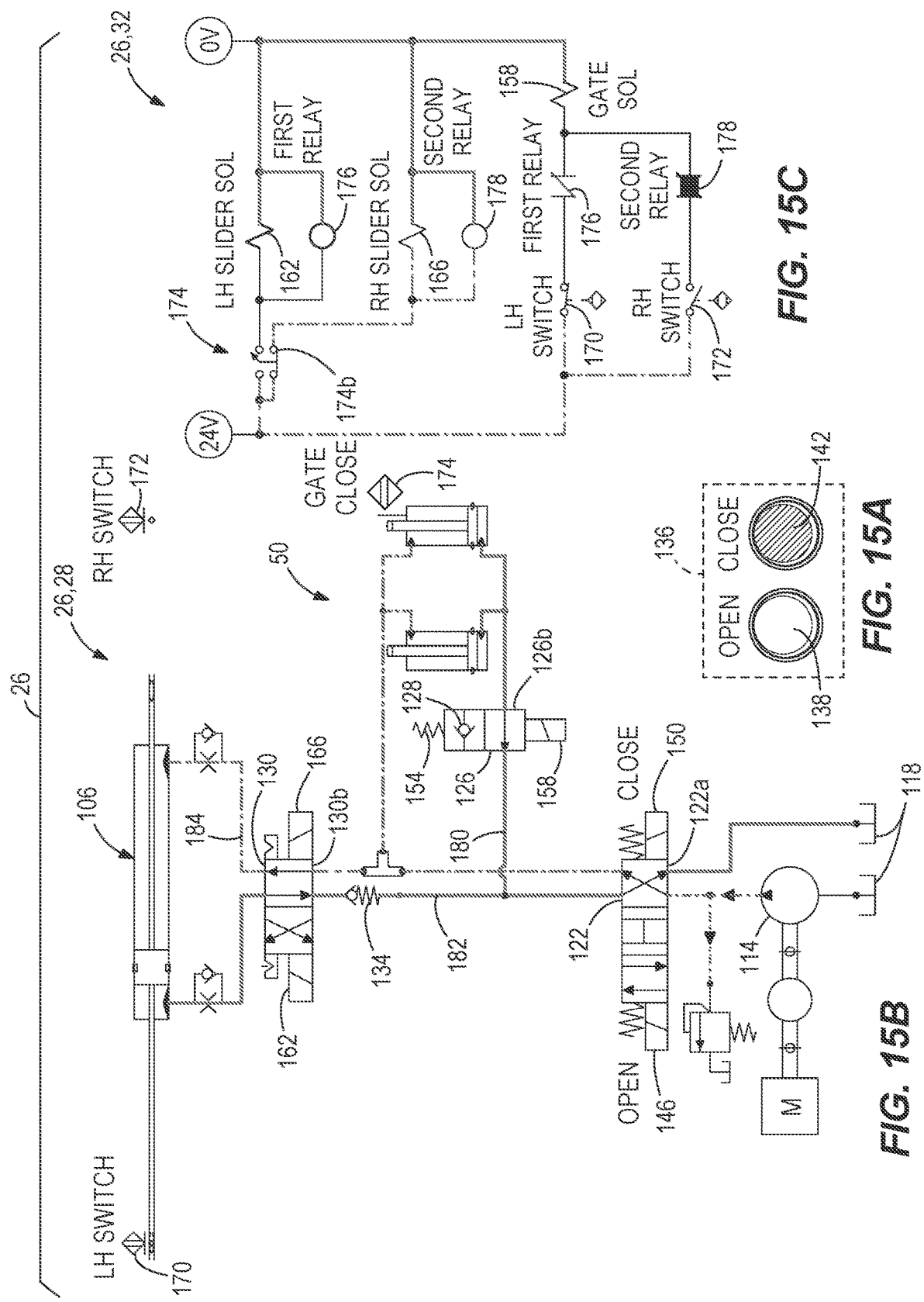

BALER AND ACCUMULATOR CONTROL SYSTEM

RELATED APPLICATIONS

This application claims priority to U.S. Provisional Patent Application No. 62/448,558 filed on Jan. 20, 2017, and is also a continuation-in-part of U.S. application Ser. No. 15/142,790, filed on Apr. 29, 2016, which claims priority to U.S. Provisional Patent Application No. 62/235,456, filed on Sep. 30, 2015, the contents of all of which are incorporated by reference herein.

BACKGROUND

The present disclosure relates to a control system for an agricultural baler.

SUMMARY

In one aspect, the disclosure provides a baling system including a baler configured to execute a baling cycle to form a bale of crop material. The baler includes a gate configured to move between a closed position and an open position. The system also includes an accumulator coupled to the baler and having a receiving area configured to receive the bale from the baler when the gate is in the open position, and an actuator configured to direct the bale received from the baler selectively toward a first accumulation area or a second accumulation area of the accumulator. The system also includes a hydraulic circuit operatively coupled to the actuator and configured to, in a first configuration, move the actuator toward the first accumulation area and, in a second configuration, move the actuator toward the second accumulation area. A hydraulic valve is moved during the baling cycle to alternate the hydraulic circuit between the first configuration and the second configuration.

In another aspect, the disclosure provides a baling system. The baling system includes a baler configured to form a package of crop material, the baler including a gate configured to move between a closed position and an open position. The baling system also includes an accumulator coupled to the baler and having a receiving area configured to receive the crop package through the gate when the gate is in the open position. The baling system also includes a crop package moving member configured to direct the crop package received from the baler selectively toward a first accumulation area or a second accumulation area of the accumulator. In a first mode, the crop package moving member is movable toward the first accumulation area and, in a second mode, the crop package moving member is movable toward the second accumulation area. The system is configured to switch between the first and second modes at least once during a crop package cycle defined between initiation of formation of the crop package within the baler and a final position of the crop package on the accumulator prior to removal of the crop package from the accumulator.

In another aspect, the disclosure provides a baling system. The baling system includes a baler configured to form a package of crop material, the baler including a gate configured to move between a closed position and an open position. The baling system also includes an accumulator coupled to the baler and configured to receive the crop package from the baler when the gate is in the open position and having an accumulation area for supporting the crop package that is clear of the gate during gate movement. The baling system also includes an actuator movable through a stroke to direct the crop package in a lateral direction toward the accumulation area. The gate is inhibited from closing until the crop package has reached a position clear of the path of the gate closing.

In yet another aspect, the disclosure provides a baling system. The baling system includes a baler configured to form a package of crop material, the baler including a gate configured to move between a closed position and an open position. The baling system also includes an accumulator coupled to the baler and configured to direct the crop package received from the baler toward at least one of a first accumulation area or a second accumulation area of the accumulator. The accumulator is configured to actuate a first position sensor in response to the crop package positioned at or near the first accumulation area of the accumulator and to actuate a second position sensor in response to the crop package positioned at or near the second accumulation area of the accumulator.

In yet another aspect, the disclosure provides a baling system including a baler configured to form a bale of agricultural product, the baler having a gate configured to alternate between a closed position and an open position. The gate is configured to actuate a switch when in the open position. The baling system also includes an accumulator coupled to the baler and configured to direct the bale received from the baler toward either a first end or a second end of the accumulator. The accumulator is configured to actuate a first position sensor in response to the bale positioned at or near the first end of the accumulator and to actuate a second position sensor in response to the bale positioned at or near the second end of the accumulator.

In yet another aspect, the disclosure provides a baling system including a baler configured to form a bale of agricultural product, the baler having a gate configured to alternate between a closed position and an open position. The baling system also includes a switch configured to be actuated by the gate when in the open position, an accumulator coupled to the baler and configured to receive the bale through the gate when the gate is in the open position, an actuator configured to direct the bale received from the baler selectively toward either a first end or a second end of the accumulator, and a hydraulic circuit operatively coupled to the actuator. In a first configuration, the hydraulic circuit is configured to move the actuator toward the first end and, in a second configuration, the hydraulic circuit is configured to move the actuator toward the second end. Actuation of the switch by the gate in the open position switches the hydraulic circuit between the first configuration and the second configuration.

Other aspects of the disclosure will become apparent by consideration of the detailed description and accompanying drawings.

BRIEF DESCRIPTION OF THE DRAWINGS

FIGS. 11A-11C collectively form a schematic diagram of a second configuration of the control system of FIGS. 8-9B.

FIGS. 12A-12C collectively form a schematic diagram of a third configuration of the control system of FIGS. 8-9B.

FIGS. 13A-13C collectively form a schematic diagram of a fourth configuration of the control system of FIGS. 8-9B.

FIGS. 15A-15C collectively form a schematic diagram of a sixth configuration of the control system of FIGS. 8-9B.

DETAILED DESCRIPTION

Before any implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways.

Figure 1:
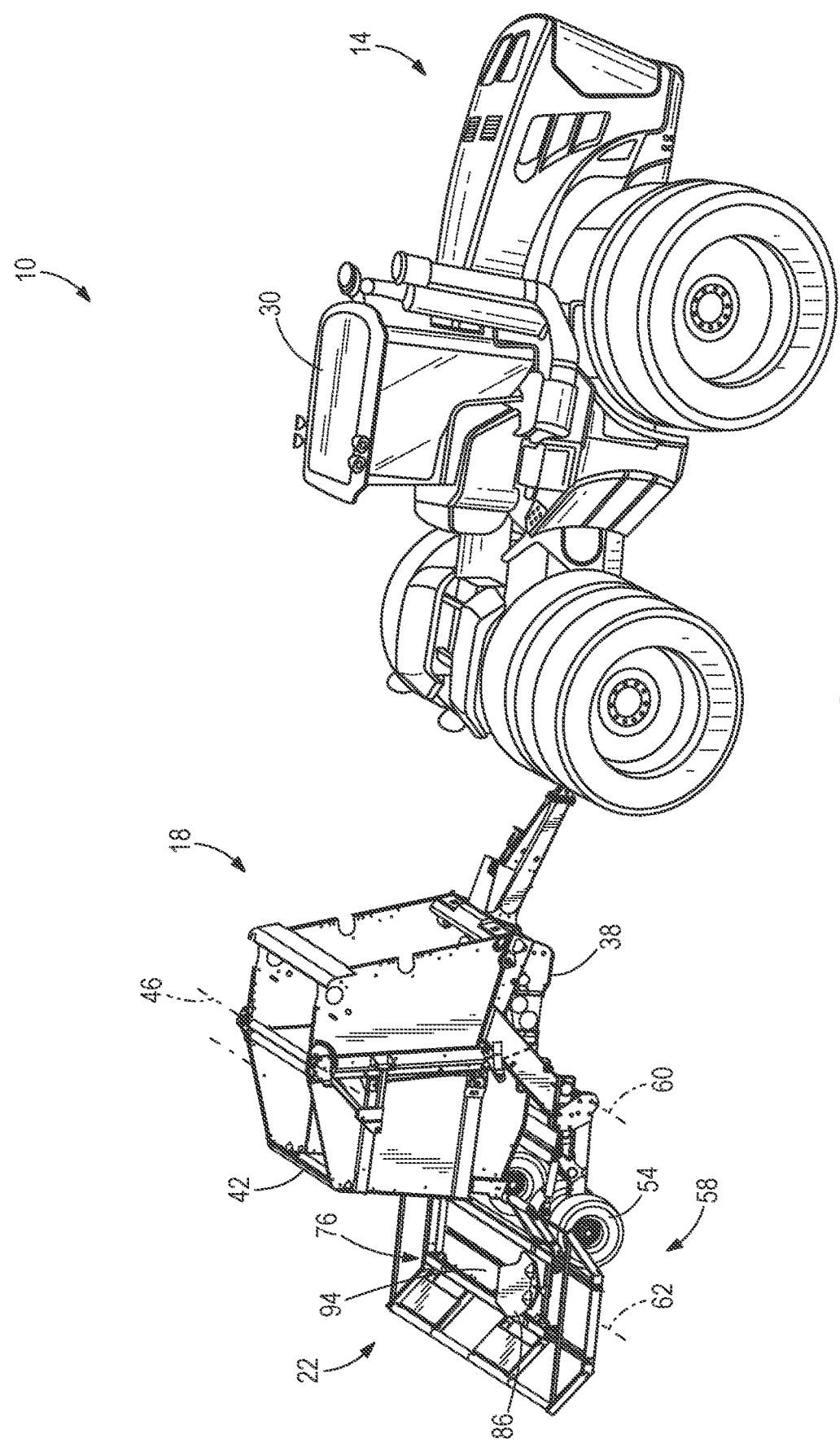
FIG. 1 is a perspective view of agricultural equipment including a vehicle coupled to an agricultural baler and an accumulator according to an implementation of the disclosure.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14 to move the baler 18 and the accumulator 22 during an agricultural process (e.g., through an agricultural field). The tractor 14 also supplies operational power in the form of hydraulic, electrical, and/or mechanical power to the baler 18 and the accumulator 22. For example, a portion of a hydraulic control system 26 is located within a cab 30 of the tractor 14 for an operator to actuate and operate components of the baler 18 and the accumulator 22, as will be discussed in detail below.

The illustrated baler 18 is configured to produce cylindrical crop packages, e.g., round bales, from an agricultural field. For example, the baler 18 may produce crop packages from hay, corn stalks, and the like. In other implementations, the baler 18 may produce cuboid crop packages, e.g., square bales, or any other shape of crop packages. In the illustrated implementation, the baler 18 includes a baler frame 38 to which a baler gate or a crop product barrier 42 is pivotally coupled about a first axis 46. The gate 42 provides a barrier between a baling chamber, in which the bale is formed inside of the baler 18, and the accumulator 18. The illustrated gate 42 is positionable between a closed position (FIG. 1) for retaining a crop package in the baler 18 (inhibiting the crop package from entering the accumulator 22) and an open position (FIG. 4) for releasing, or allowing a crop package to pass out of the baler 18, to the accumulator 22, by a gate actuator 50, e.g., one or more hydraulic cylinders, pneumatic cylinders, or the like. In the illustrated implementation, the gate actuator 50 includes two hydraulic cylinders each having a cap side and a rod side for receiving and exhausting a pressurized hydraulic fluid. In the illustrated implementation, the gate 42 follows an arcuate path between the open position and the closed position. In other implementations, the gate 42 may translate or slide between the closed position and the open position, or may follow a path including any number and combination of pivoting, rotating, rocking, sliding and translating. Generally, the gate 42 follows an opening path from the closed position to the open position and a closing path from the open position to the closed position. The closing path includes any space occupied by the gate 42 as the gate moves from the open position to the closed position. The opening path includes any space occupied by the gate 42 as the gate moves from the closed position to the open position.

Figure 2:
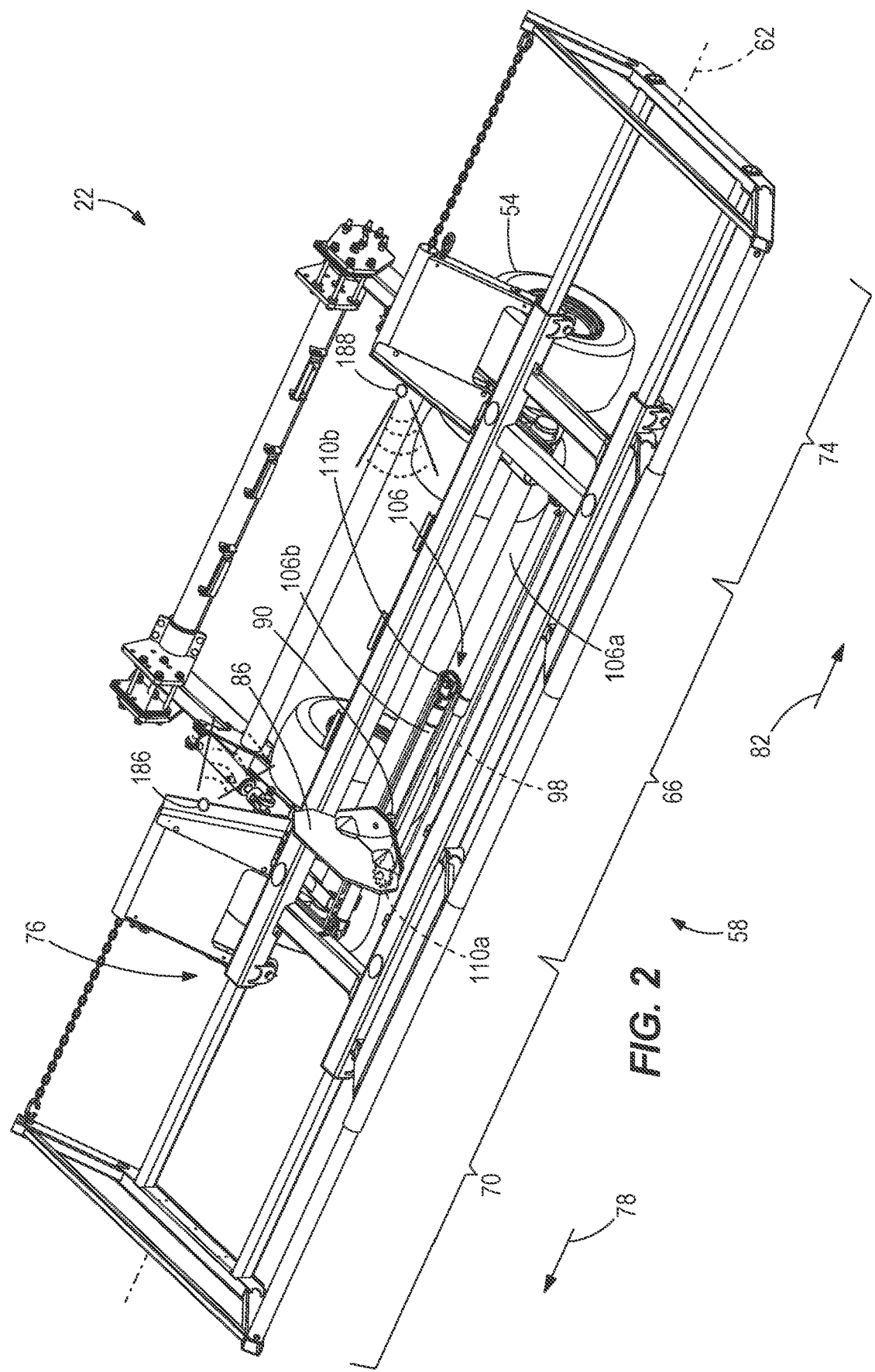
FIG. 2 is a top perspective view of the accumulator of FIG. 1.

With continued reference to FIGS. 1 and 2, the illustrated accumulator 22 is coupled to the baler frame 38 such that the baler 18 and the accumulator 22 are supported by common axles and related structure, e.g., wheels 54, although the accumulator 22 can have its own dedicated axles, wheels, and other supporting structure. An accumulator frame 58 is pivotably coupled relative to the baler frame 38 about a second axis 60 (FIG. 1) and includes a middle frame portion 66, a first side frame portion 70 (also referred to herein as a first accumulation area), and a second side frame portion 74 (also referred to herein as a second accumulation area). The illustrated frame portions 66, 70, 74 define a bale carriage area 76 configured to support the crop packages (not shown in FIGS. 1 and 2). The frame portions 66, 70, 74 are coupled (e.g., fixedly coupled, adjustably coupled, or pivotally coupled) to the rest of the accumulator frame 58 at an axle 40 defining a third axis 62, which extends longitudinally along a length of the bale carriage area 76. The middle frame portion 66 is positioned between the side frame portions 70, 74 with the side frame portions 70, 74 slidably extendable parallel to the third axis 62 towards and away from the middle frame portion 66, and parallel to a first direction arrow 78 and a second direction arrow 82. In other implementations, the side frame portions 70, 74 may pivot relative to the middle frame portion 66 about an axis generally perpendicular to the third axis 62, e.g., the side frame portions 70, 74 may fold into the middle frame portion 66 to achieve lateral movement of the side frame portions 70, 74. In yet other implementations, the side frame portions 70, 74 may be fixed in the extended position and the crop packages may be pushed and slid thereon.

Figure 3:
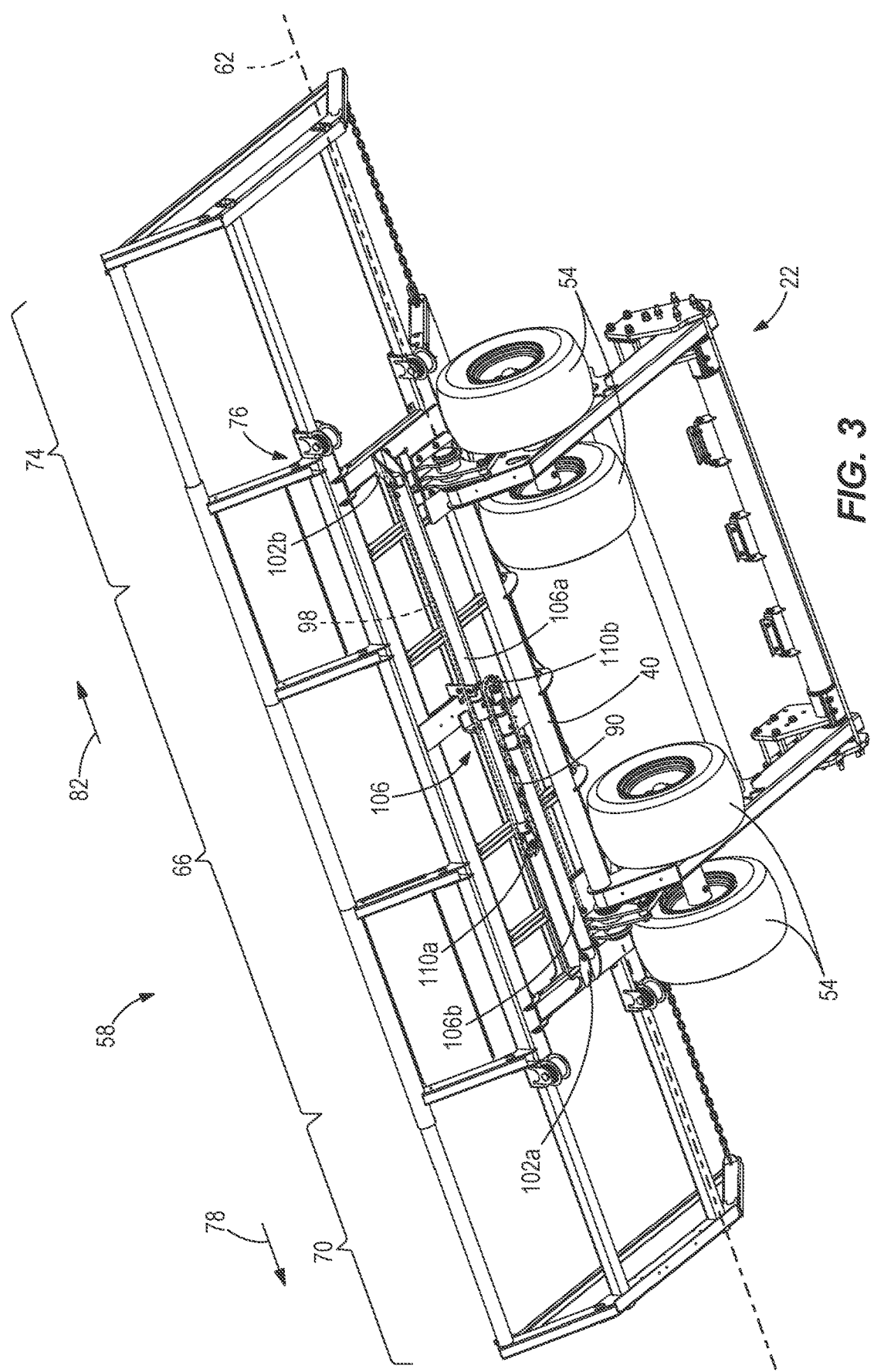
FIG. 3 is a bottom partial perspective view of the accumulator of FIG. 1.

With reference to FIGS. 2 and 3, a bale moving member 86 (e.g., a crop package member or product engagement member or slider) is illustrated as having a plate-like portion having a bale-pushing surface oriented substantially perpendicular to the third axis 62, is slidably coupled to the middle frame portion 66, and is slidable in the directions 78, 82. In other words, the bale moving member 86 is movable in two opposing directions (e.g., left and right or, alternatively, up and down, etc.). The plate-like portion of the bale moving member 86 may be generally planar or have any other suitable shape or form for pushing or pulling the bale. The bale moving member 86 may be slidably coupled to the middle frame portion 66 in any suitable manner, e.g., by any suitable linkage. The bale moving member 86 may also be embodied as a conveyor, e.g., having a movable support surface for conveying bale to one side or the other. Furthermore, for example, the illustrated bale moving member 86 may include a base 90 that extends below a platform 94 (shown in FIG. 1 but not shown in FIG. 2 for clarity of other components associated with the accumulator 22) of the middle frame portion 66, and is fixedly coupled to a linkage 98, e.g., a roller chain. In other implementations, the linkage 98 may be another linkage, e.g., a cable, rope, a coupling, a joint, a slider, etc., or the like. Both ends 102*a*, 102*b* (FIG. 3) of the linkage 98 are coupled to a crop package actuator 106. The actuator 106 may include any suitable arrangement of one or more hydraulic or pneumatic actuators or cylinders and rods, or other actuators powered in another suitable manner, or the like. As one example, the actuator 106 may include two hydraulic actuators 106*a*, 106*b* as shown in FIGS. 1-3. As another example, the actuator 106 may include a double rod end cylinder as shown schematically in FIGS. 8-15C. Any suitable linkage and actuator arrangement may be employed without changing the principle of operation of the control system 26 described herein. It should be understood that the hydraulic actuator 106 shown in FIGS. 8-15C schematically represents any of the suitable types of actuators 106 as would be understood by one of ordinary skill in the art.

Continuing the example shown in FIGS. 1-3, the hydraulic actuators 106*a*, 106*b*, each include a sprocket 110 that engages the linkage 98. For example, the first crop package hydraulic actuator 106*a* is coupled to a first sprocket 110*a*, and the second crop package hydraulic actuator 106*b* is coupled to a second sprocket 110*b*. In the illustrated implementation, the sprockets 110*a*, 110*b* uniformly move together in either direction 78, 82 via engagement between the linkage 98 and the sprockets 110*a*, 110*b*. Accordingly, extension of the first hydraulic cylinder 106*a* moves the first sprocket 110*a* in the first direction 78, which pulls the linkage 98 and therefore the base 90 and bale moving member 86 in the first direction, and extension of the second hydraulic actuator 106*b* moves the second sprocket 110*b* in the second direction 82, which pulls the linkage 98 and therefore the base 90 and bale moving member 86 in the second direction 82.

The control system 26 is illustrated in FIGS. 8-15C and includes a hydraulic circuit 28 illustrated as a closed loop system, a plurality of sensors (which will be described below), and a relay circuit 32.

Specifically, the control system 26 sensors include a first bale location switch or left hand (LH) switch 170 (used synonymously herein), a second bale location switch or right hand (RH) switch 172 (used synonymously herein), and a gate switch 174. The sensors 170, 172, and 174 are illustrated schematically in the hydraulic circuit diagrams of FIG. 8 and FIGS. 10B-15B. The control system 26 sensors may also include sensors 186, 188 for detecting the bale (and/or absence of the bale) and/or an arm 190 for detecting the bale (and/or absence of the bale). The sensors 186, 188 may include optical sensors (e.g., light-detecting), audio sensors (e.g., sonar), etc., that detect the presence or proximity of a bale, or absence thereof. The sensor 186 is a left side sensor and the sensor 188 is a right side sensor. The arm 190 may include a tactile sensor, such as a pressure sensor, a ping sensor, a vibration sensor, a movable arm with switch, etc. It should be appreciated that the sensors 186, 188, and 190 may be used in addition to, instead of, or as the sensors 170 and/or 172, though only the sensors 170, 172 will be named in the description below. For example, the sensors 186, 188, 190 may generate electronic signals that give feedback to a controller that will provide the connection to the appropriate resulting action, as will be described in detail below.

Figure 5:
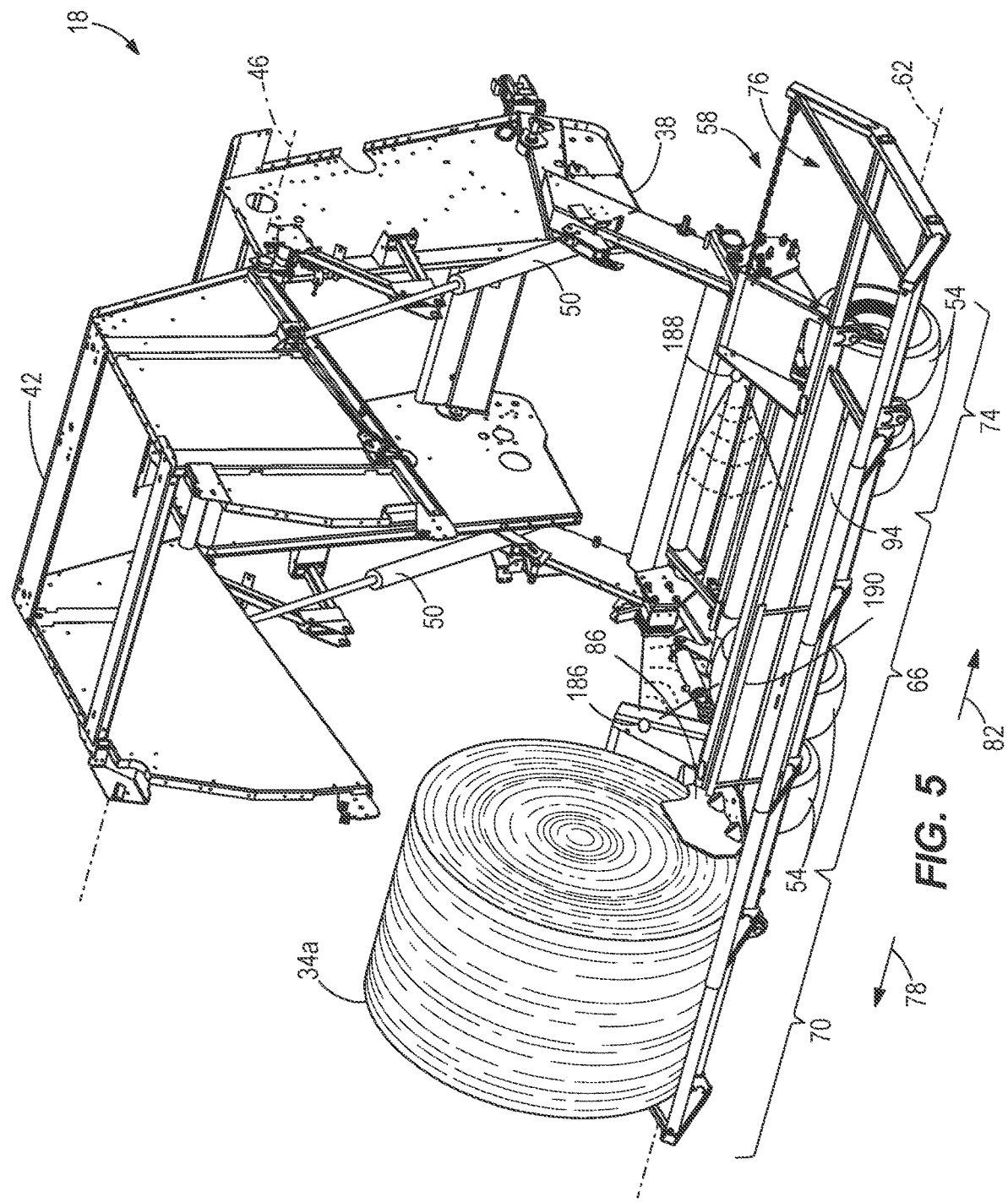
FIG. 5 is a perspective view of the baler and the accumulator with the first crop package located in a first side position on the accumulator.

The LH switch 170 is a first position sensor and may be disposed in any location suitable to sense when the bale is out of the way of the gate 42 in the first direction 78, e.g., to a first side position on the accumulator 22 at or near the first side frame portion 70 at the first end (FIG. 5 as will be described in greater detail below). The bale is "at or near" the first end in the first accumulation area when the bale is moved laterally towards the first end a distance sufficient to be clear of a closing path of the gate 42. For example, in the illustrated implementation, the LH switch 170 is configured to sense, directly or indirectly, when the crop package actuator 106 is moved to a position (or moved a predetermined distance to a position) in which the bale is out of the way of the gate 42 in the first direction 78. For example, the LH switch 170 may be operatively coupled to (e.g., at or near) the first side frame portion 70 and configured to be actuated by the bale itself, by any component of the accumulator 22 indicative of the position of the bale such as the bale moving member 86, the linkage 98, etc., or by the crop package actuator 106 being moved a predetermined distance to a position in which the bale is out of the way of the gate 42 in the first direction, e.g., the first side position. The bale is "at or near" the second end when the bale is moved laterally towards the second end a distance sufficient to be clear of the closing path of the gate 42. Specifically, the LH switch 170 may be located adjacent the crop package actuator 106 when the crop package actuator 106 is extended such that the bale is moved in the first direction 78. Similarly, the RH switch 172 is a second position sensor and may be disposed in any location suitable to sense, directly or indirectly, when the bale is out of the way of the gate 42 in the second direction 82, e.g., to a second side position or second accumulation area on the accumulator 22 at or near the second side frame portion 74 at the second end (FIG. 7 as will be described in greater detail below). For example, the RH switch 172 may be operatively coupled to (e.g., at or near) the second side frame portion 74 and configured to be actuated by the bale itself, by any component of the accumulator 22 indicative of the bale position such as the bale moving member 86, the linkage 98, etc., or by the crop package actuator 106 being in a position in which the bale is out of the way of the gate 42 in the second direction 82, e.g., the second side position. Specifically, the RH switch 172 may be located adjacent the crop package actuator 106 when the crop package actuator 106 is extended such that the bale is moved in the second direction 82. The LH switch 170 and the RH switch 172 may be opened or closed by actuation, depending on the configuration of the relay circuit 32, to achieve the desired result as is well understood in the art. In the illustrated implementation, the LH switch 170 and the RH switch 172 are closed when actuated and open when not being actuated.

The gate switch 174 is disposed proximate the gate 42 when the gate is in the open position such that the gate 42 actuates the gate switch 174 upon reaching the open position. However, in other implementations, the gate switch 174 may be disposed proximate any position of the gate 42 (e.g., closed or between open and closed) such that the gate 42 actuates the gate switch 174 upon reaching any corresponding position. The gate switch 174 is a multi-position switch that changes positions on each actuation, e.g., toggles or switches. In the illustrated implementation, the gate switch 174 is a two-position switch that when actuated switches from a first position 174a (FIG. 10C) to a second position 174b (FIG. 12C) and when subsequently actuated switches from the second position 174b to the first position 174a, and so forth. In other words, the gate switch 174 moves one way between the first and second positions 174a, 174b each time the gate 42 opens. In other implementations, the gate switch 174 may have more than two positions and the relay circuit 32 may be adapted accordingly. In even further implementations, the gate switch 174 may be a sensor, such as a rotational potentiometer or other electric signal-generating sensor, that gives feedback to a controller that will provide the connection to the appropriate direction.

In the illustrated implementation, the hydraulic circuit 28 is operable by hydraulic fluid; however, in other implementations, the hydraulic circuit 28 may be pneumatically operable, etc. The hydraulic circuit 28 includes a hydraulic pump 114, a hydraulic tank 118, a selective control valve 122, a gate valve 126, a directional valve 130, and a check valve 134 adjacent the directional valve 130, which are all connected by hydraulic lines in a closed circuit as shown and as will be described in greater detail below.

The hydraulic pump 114 and the hydraulic tank 118 are fluidly coupled to the selective control valve 122. The selective control valve 122 is positionable in three positions such that the pump 114 and the reservoir 118 are coupled to the control valve 122 in a first position 122a (FIG. 10B), a second position 122b (FIG. 11B), and a third position 122c (FIG. 13B). The control valve 122 is operable by the operator actuating an actuation device 136, or actuation devices, located within the tractor cab 30. The actuation device 136 may include one or more buttons, switches, etc., or other tactile feedback sensors or devices actuatable by the operator. The actuation device 136 may also be automatically actuated by a controller, as will be described in greater detail below. For example, in the illustrated implementation and as shown in FIGS. 8, 10A, 11A, 12A, 13A, 14A, and 15A, the actuation device 136 includes an OPEN button 138 and a CLOSE button 142 that are actuatable by the operator. In this implementation, the OPEN button 138 and the CLOSE button 142 selectively activate an OPEN solenoid 146 and a CLOSE solenoid 150 (FIG. 8), respectively, to move the selective control valve 122 between the first, second, and third positions 122a, 122b, 122c. In other implementations, the selective control valve 122 may be movable in any suitable way. Furthermore, in other implementations, the control valve 122 may be actuated by one, three, or more actuation devices, or may be automatically actuated (e.g., by electric sensors and a controller).

The gate valve 126 is disposed in a gate hydraulic line 180 and is movable between a first position 126a and a second position 126b in any suitable fashion. For example, in the illustrated implementation, the gate valve 126 is biased to the first position 126a (FIG. 12B) by a spring 154 and movable against the biasing force of the spring 154 to the second position 126b (FIG. 10B) by activation of a gate solenoid 158. As used in the present description and appended claims, to bias means to apply a force or urge in a desired direction. Particularly, in this example, the biasing force is constantly applied by the spring 154 and must be overcome by another selectively applied force, such as by the activated gate solenoid 158, acting against the spring 154 to change the position of the gate valve 126. In the first position 126a, a check valve 128 inhibits or blocks hydraulic fluid flow through the gate hydraulic line 180 in a direction out of the cap sides of the gate hydraulic actuator 50 towards the tank 118 (see FIG. 13B), thereby inhibiting the gate 42 from closing as will be described in greater detail below. In the second position 126b, hydraulic fluid flows freely through the gate valve 126 and thus through the gate hydraulic line 180 (see FIG. 14B).

Figure 9A:
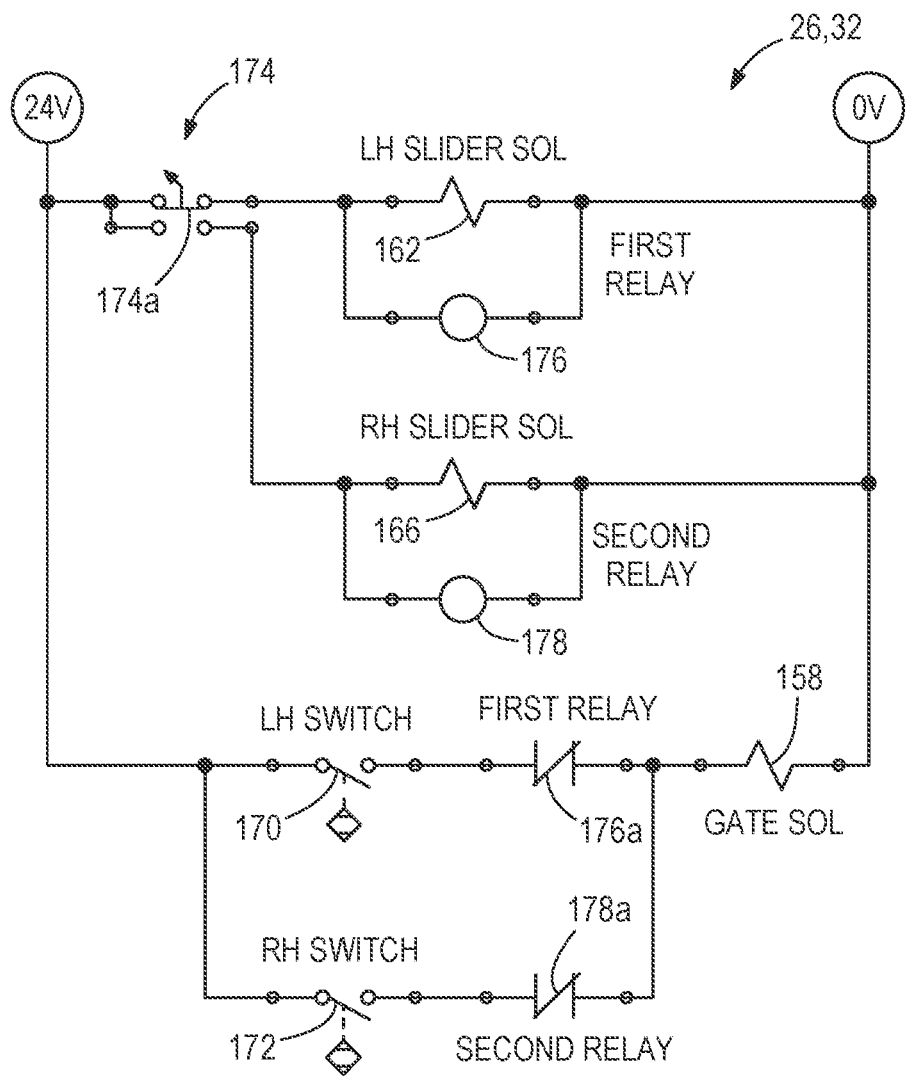
FIG. 9A is a schematic diagram of a relay circuit operatively coupled to the hydraulic system of FIG. 8 and forming another part of the control system.
Figure 9B:
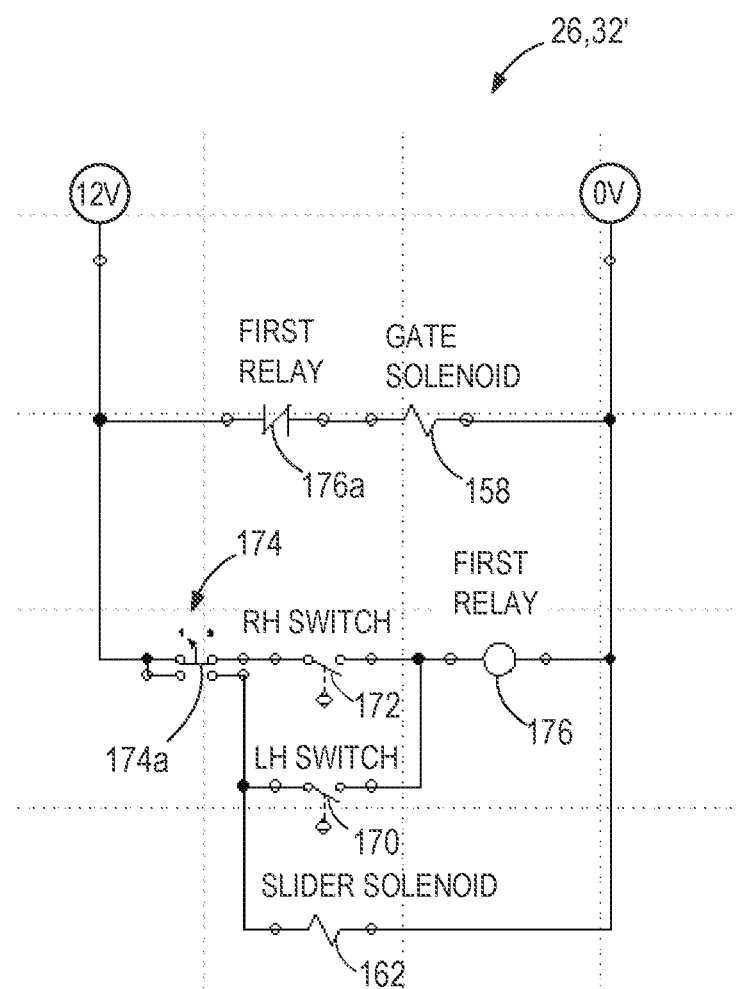
FIG. 9B is a schematic diagram of an alternative relay circuit operatively coupled to the hydraulic system of FIG. 8 and forming another part of the control system.

The directional valve 130 and the check valve 134 are fluidly disposed in a first slider hydraulic line 182. The directional valve 130 is also disposed in a second slider hydraulic line 184. The directional valve 130 is movable between a first position 130a (see FIG. 10B) and a second position 130b (see FIG. 12B) in any suitable fashion. For example, in the illustrated implementation, the directional valve 130 is movable to the first position 130a by activation of a left hand (LH) slider solenoid 162 and movable to the second position 130b by activation of a right hand (RH) slider solenoid 166. The relay circuit corresponding with this implementation is illustrated in FIG. 9A, which will be described in greater detail below. In other implementations, the directional valve 130 may be biased in one direction by way of a spring, requiring only one solenoid 162 to activate the directional valve 130 into the first position 130a (or alternatively into the second position 130b), and when inactivated, the spring will return the directional valve 130 to the second position 130b (or alternatively to the first position 130a). The relay circuit corresponding with this alternative implementation is illustrated in FIG. 9B, which will be described in greater detail below.

The directional valve 130 is fluidly connected to the actuator 106 by way of the first and second slider hydraulic lines 182, 184. In the first position 130a, the directional valve 130 is fluidly connected to move the actuator 106 in one direction (e.g., the first direction 78 or the second direction 82) and in the second position 130b the directional valve 130 is fluidly connected to move the actuator 106 in the other direction (e.g., the other of the first direction 78 or the second direction 82) generally opposite the one direction.

Referring to FIG. 9A, the relay circuit 32 includes a first relay 176 and a second relay 178. The first relay 176 includes a first contact 176a in series with the LH switch 170, while the second relay 178 includes a second contact 178a in series with the RH switch 172n the illustrated implementation, the first and second relay contacts 176a, 178a are normally closed. However, in other implementations, the relay circuit 32 may be configured to achieve the same results using normally open contacts by adjusting other components and arrangements as would be understood by those having ordinary skill in the art. For example, FIG. 9B illustrates an alternative relay circuit 32' corresponding with the alternative hydraulic arrangement discussed above in which the directional valve 130 is spring biased and has one solenoid 162.

The relay circuit 32 also includes the gate switch 174. The gate switch 174, in its first position (e.g., FIG. 10C), allows electrical current flow to the LH slider solenoid 162 and the first relay 176 (such that the LH slider solenoid 162 and the first relay 176 are activated) and cuts off electrical current flow to the RH slider solenoid 166 and the second relay 178 (such that the RH slider solenoid 166 and the second relay 178 are not activated). The gate switch 174, in its second position (e.g., FIG. 12C), allows current flow to the RH slider solenoid 166 and the second relay 178 (such that the RH slider solenoid 166 and the second relay 178 are activated) and cuts off current flow to the LH slider solenoid 162 and the first relay 176 (such that the LH slider solenoid 162 and the first relay 176 are not activated).

In operation, the control system 26 uses the RH switch 172 and the LH switch 170 to signal when the crop package actuator 106 is in a position such that the bale is (or would be) clear of the gate 42 so the gate 42 can close without being impeded by the bale. In some implementations, the bale need not be present as the control system 26 may operate based on the position of the crop package actuator 106 alone. The position of the crop package actuator 106 may indicate that the bale, if present, is clear of the gate 42 and may also indicate that the crop moving member 86 is clear of the gate 42. The bale moving member 86, for example, and thus the bale, are clear of the gate 42 when, after a bale has formed and been released from the baler 18 through the gate 42 being in the open position, one of the LH switch 170 or the RH switch 172 is subsequently actuated. In other words, when one of the LH switch 170 or the RH switch 172 is subsequently actuated, the bale moving member 86 has completed a stroke (and is fully extended or, in other implementations, fully retracted or in another suitable condition such as partially extended or retracted), after the bale was released, that moved the bale to the left side or right side on the accumulator 22 and out of the way of the gate 42. The position of the bale and the bale-moving components when moved to the left side (i.e., in the first direction 78) may be referred to herein as the left position or the first side position, interchangeably, the bale then being located in a first accumulation area of the accumulator. Alternatively, or in addition, the control system 26 may use one or more of the sensors 186, 188, 190 to determine when the bale is in a position such that the bale is clear of the gate 42 so the gate 42 can close without being impeded by the bale. The sensors 186, 188, 190 may detect the presence or absence of the bale and/or the bale moving member 86 in a particular location. For example, the sensors 186, 188, 190 may detect that the bale and/or the bale moving member 86 is not proximate the gate 42 (absence of the bale and/or bale moving member 86) or that the bale is in a location away from the gate 42 (presence of the bale and/or bale moving member 86 elsewhere). Detection of the presence or absence of the bale moving member 86 may represent detection of the bale as it may be assumed that the bale has moved with the bale moving member 86. Alternatively, the sensors 186, 188, 190 may detect the position of the crop package actuator 106 and/or of its associated linkage 98.

The position of the bale and the bale-moving components when moved to the right side (i.e., in the second direction 82) may be referred to herein as the right position or the second side position, interchangeably, the bale then being located in a second accumulation area of the accumulator. The crop package actuator 106 may continue to move the bale further to the left side and the right side even after the LH switch 170 and the RH switch 172 are actuated, respectively.

Figures 10A, 10B, 10C:
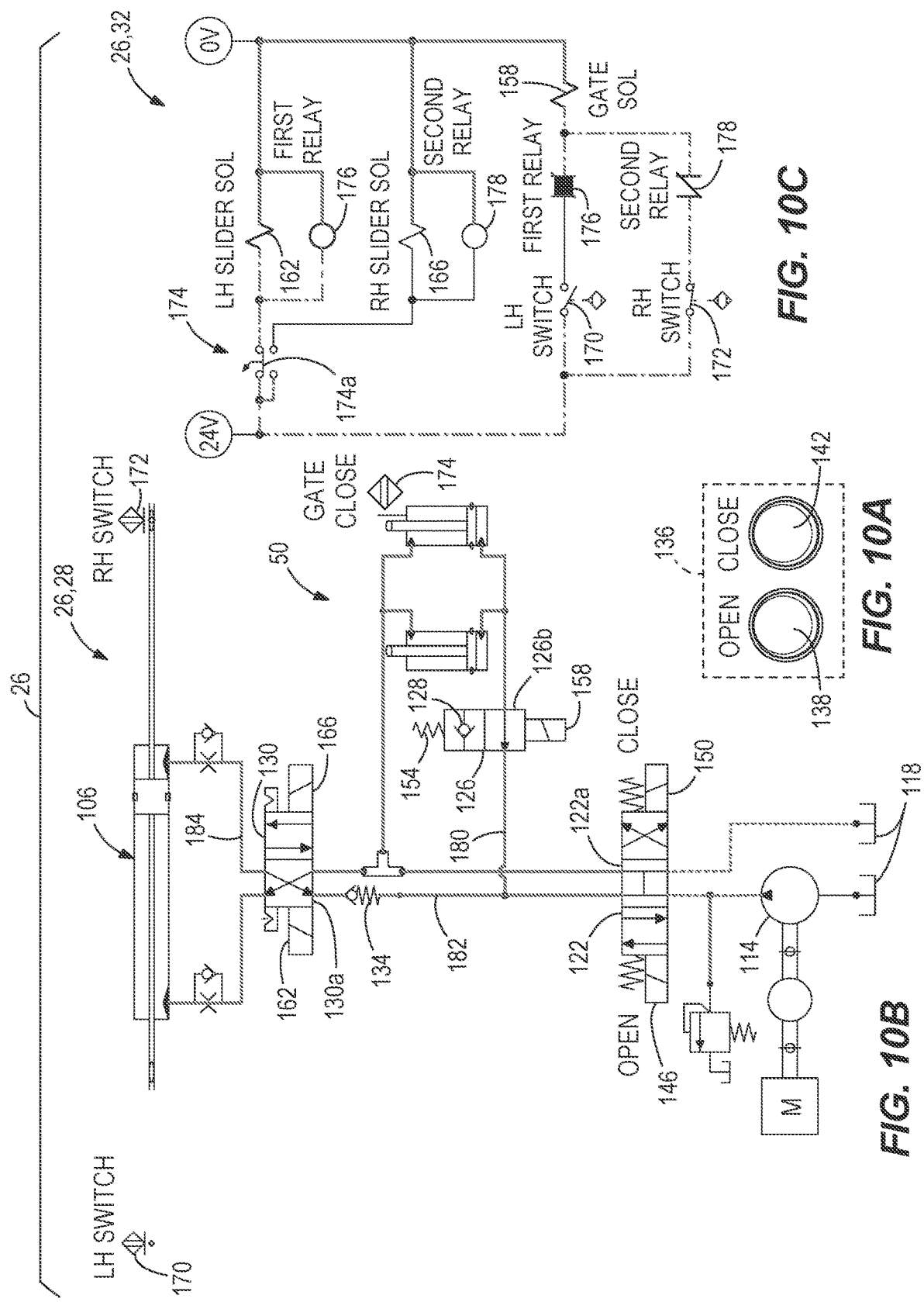
FIGS. 10A-10C collectively form a schematic diagram of a first configuration of the control system of FIGS. 8-9B.

FIGS. 10A-10B illustrate an example of a first configuration, which may be an initial state, of the control system 26 in which a first bale 34a (see FIG. 4) is forming in the baler 18, the gate 42 is closed, and the bale moving member 86 is not moving (e.g., as shown in FIG. 1). In this example, the bale moving member 86 and the crop package actuator 106 are resting in the right position such that the RH switch 172 is actuated, e.g., closed. The gate switch 174 is in the first position such that the LH slider solenoid 162 and the first relay 176 are activated by a current flow in the relay circuit 32. With the LH slider solenoid 162 activated, the directional valve 130 is in the first position 130a. Because the first relay 176 is normally closed, the first contact 176a is now open in the first configuration while activated. However, the second relay 178 is not activated and the second contact 178a is therefore now closed. As both the RH switch 172 and the second relay 178 are closed in the first configuration, the gate solenoid 158 receives current and the gate valve 126 is therefore in the second position 126b, which will allow the gate 42 to be opened. Because the operator has not actuated the actuation device 136 to command the gate 42 to open or close in the first configuration, the selective control valve 122 is in its neutral position, the first position 122a.

Figure 4:
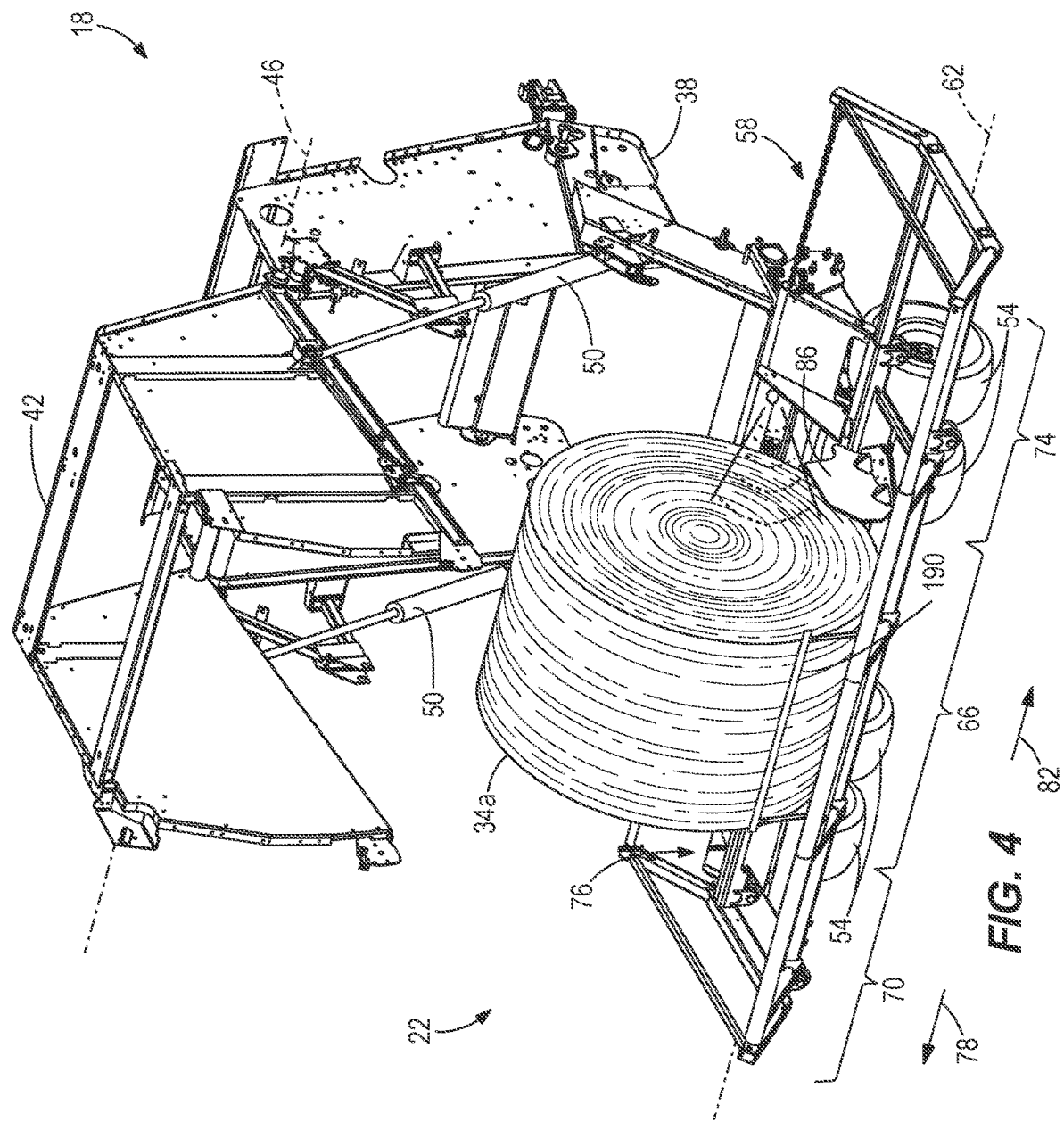
FIG. 4 is a perspective view of the baler and the accumulator with the first crop package located in a middle position on the accumulator.

FIGS. 11A-11C illustrate the next configuration, or second configuration, of the control system 26 in which the operator actuates the OPEN button 138 to release the bale 34a when the bale 34a has been formed (for example, see FIG. 4 in which the bale 34a has been released). Actuation of the OPEN button 138 powers the OPEN solenoid 146 to move the selective control valve 122 to the second position 122b. Alternatively, the OPEN solenoid 146 may be powered automatically in response to meeting a condition or set of conditions, e.g., when the bale 34a has been formed, when a predetermined location on the field has been reached, etc. In the second position 122b, the pump 114 via the control valve 122 is fluidly coupled to the gate hydraulic actuator 50 by the gate hydraulic line 180. Thus, the pump 144 is fluidly connected to provide pressurized hydraulic fluid to the gate actuator 50 to open the gate 42 when the control valve 122 is in the second position 122b and the gate valve 126 is in the second position 126b. The pump 114 is not fluidly coupled to the hydraulic actuator 106 because the check valve 134 inhibits or blocks fluid flow to the hydraulic actuator 106 through the slider hydraulic line 182 when the selective control valve 122 is in the second position 122b. In the second configuration, no change from the first configuration occurs with respect to the RH switch 172 and the gate switch 174. Therefore, the relay circuit 32 continues to provide current to the gate solenoid 158 as described above with respect to the first configuration.

FIGS. 12A-12C illustrate the next configuration, or third configuration, of the control system 26 in which the OPEN command is completed and the gate 42 becomes fully opened, as shown in FIG. 4. When the gate 42 reaches the open position, the gate 42 actuates the gate switch 174 and the first bale 34a is released onto the accumulator 22. As shown in FIG. 12C, the gate switch 174 moves from the first position 174a to the second position 174b, thereby ceasing to provide current to the LH slider solenoid 162 and the first relay 176 while now providing current to the RH slider solenoid 166 and the second relay 178. Due to activation of the RH slider solenoid 166 and deactivation of the LH slider solenoid 162, the directional valve 130 moves from the first position 130a to the second position 130b. This configures the hydraulic circuit 28 to move the crop package actuator 106 (and thus the bale moving member 86) through a stroke in the opposite direction from the preceding stroke. That is, every time the gate 42 opens and the gate switch 174 is actuated, the directional valve 130 changes the direction of the first and second slider hydraulic lines 182, 184 in preparation for future activation of the crop package actuator 106. Due to activation of the second relay 178, the second relay 178 opens. Because the second relay 178 is open and the LH switch 170 is open, the gate solenoid 158 does not receive current. Absent activation of the gate solenoid 158, the gate valve 126 returns to the first position 126a as provided by the biasing force of the spring 154. In the first position 126a, the check valve 128 inhibits or blocks release of hydraulic fluid from the gate actuator 50, thereby inhibiting or blocking closing of the gate actuator 50. In other words, the gate actuator 50 is effectively locked in the open position by the gate valve 126 in the first position 126a. Meanwhile, the bale 34a rests in the accumulator 22 near the open gate 42. Thus, the gate 42 is inhibited from closing while the bale 34a is in the closing path of the open gate 42. In other implementations, the gate 42 may be inhibited from closing in other manners, e.g., by programming a controller.

FIGS. 13A-13C illustrate the next configuration, or fourth configuration, of the control system 26 in which the operator actuates the CLOSE button 142. Actuation of the CLOSE button 142 powers the CLOSE solenoid 150 to move the selective control valve 122 to the third position 122c. Alternatively, the CLOSE solenoid 150 may be powered automatically in response to meeting a condition or set of conditions, e.g., when the bale 34a is released from the baler 18, when the bale 34a is supported by the accumulator 22, etc. In the third position 122c, the pump 114, via the control valve 122 and the slider hydraulic line 182, is fluidly coupled to the crop package actuator 106. The gate actuator 126 is still in the first position 126a. Thus, actuation of the CLOSE button 142 by the operator causes the bale moving member 86 to fully move the bale 34a before the gate 42 can begin to move. Thus, the gate 42 is still inhibited from closing until the bale 34a is out of the way. Specifically, because the directional valve 130 is in the second position 130b, the hydraulic circuit 28 is configured for the pump 114 to be fluidly coupled to the crop package actuator 106 in such a way that moves the bale moving member 86 in the first direction 78. During movement of the bale moving member 86 through its stroke, the RH switch 172 becomes de-actuated and moves to the open position, which does not change the state of the gate solenoid 158, which still does not receive current. Thus, during movement of the bale moving member 86, the gate solenoid 126 remains in the first position 126a and the gate 42 therefore remains in the open position and is inhibited from closing. FIG. 5 shows the first bale 34a fully moved in the first direction 78 to the left side position.

Figures 14A, 14B, 14C:
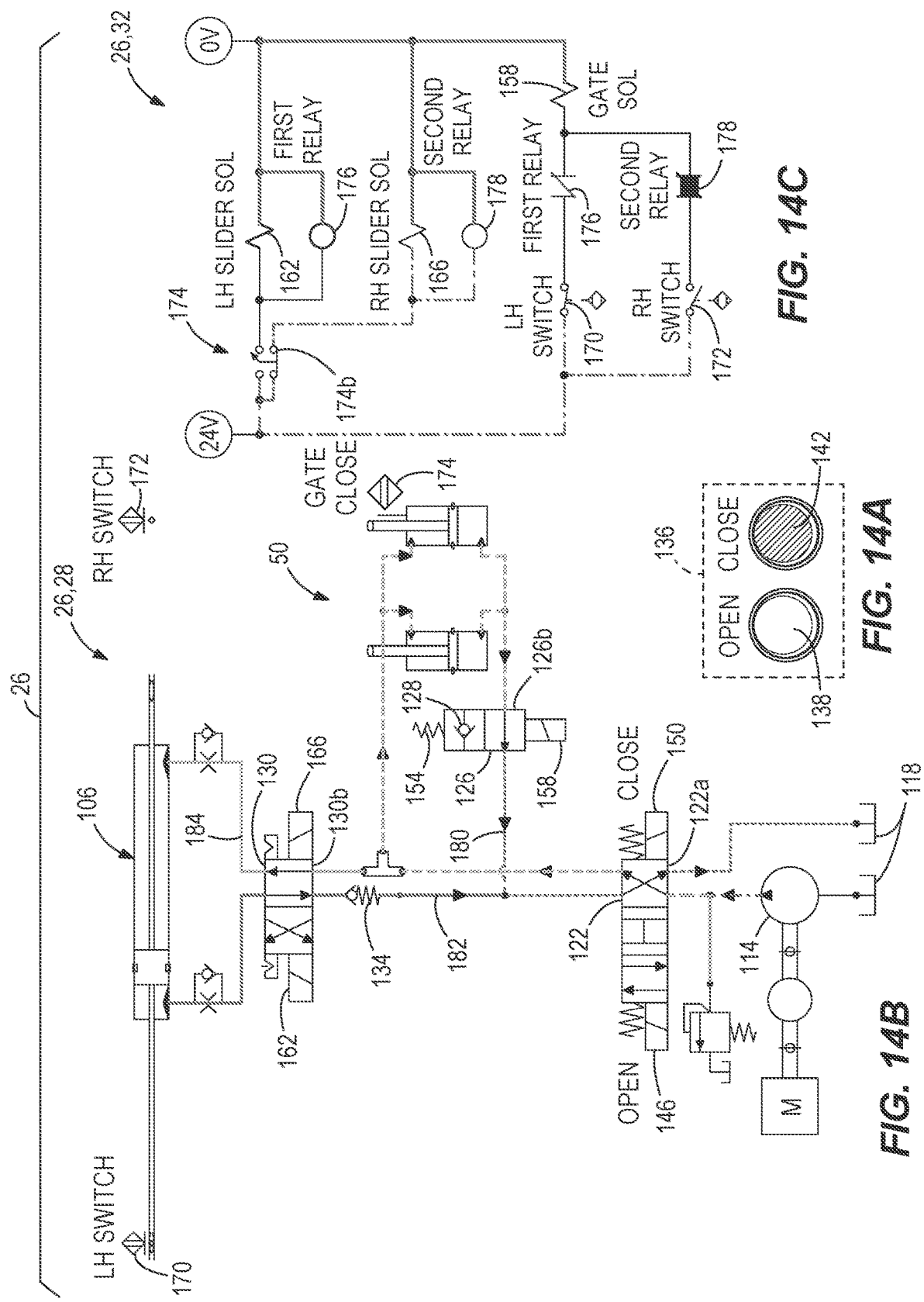
FIGS. 14A-14C collectively form a schematic diagram of a fifth configuration of the control system of FIGS. 8-9B.

FIGS. 14A-14C illustrate the next configuration, or fifth configuration, of the control system 26 in which the gate 42 can close. When the hydraulic actuator 106 completes its stroke such that the bale moving member 86 reaches its opposite position (e.g., the left side position) and the first bale 34a is out of the way (e.g., in the left side position) then the LH switch 170 is actuated. Actuation of the LH switch 170 effectively signals that the bale 34a is out of the way of the gate 42, as shown in FIG. 5, such that the gate 42 can close (e.g., is no longer inhibited from closing). With reference to FIG. 14C, actuation of the LH switch 170 closes the LH switch 170. Since the first contact 176a is normally closed, current flows through the gate solenoid 158 in the fifth configuration, which moves the gate valve 126 from the first position 126a to the second position 126b. In the second position 126a, the cap sides of the gate actuator 50 are fluidly connected to the tank 118 and the rod sides of the gate actuator 50 can begin to receive pressurize hydraulic fluid from the pump 114 such that the gate 42 can close. Thus, when the operator commands the gate 42 to close (by actuating the CLOSE button 142), first the bale 34a is moved out of the way of the gate 42 in the fourth configuration and then, after the bale is moved, the gate 42 automatically begins to close in the fifth configuration.

FIGS. 15A-15C illustrate the next configuration, or sixth configuration, of the control system 26 in which a second bale 34b is forming in the baler 18, the gate 42 is closed, and the slider actuator 106 is not moving (e.g., as may be shown in FIG. 1). The sixth configuration may sometimes be an initial state. The sixth configuration is generally opposite the first configuration because each of the RH switch 172, the LH switch 170, and the gate switch 174 are in opposite positions compared to the first configuration. In the sixth configuration, the crop package actuator 106 is resting in the left position such that the LH switch 170 is actuated, e.g., closed and the RH switch 172 is not actuated, e.g., open. The gate switch 174 is in the second position such that the RH slider solenoid 166 and the second relay 178 are activated. With the RH slider solenoid 166 activated, the directional valve 130 is in the second position 130b. Because the second relay 178 is normally closed, the second contact 178a is now open in the sixth configuration while activated. However, the first relay 176 is not activated and the first contact 176a is therefore now closed. As both the LF switch 170 and the first relay 176 are closed in the sixth configuration, the gate solenoid 158 receives current and the gate valve 126 is therefore in the second position 126b, which will allow the gate 42 to be opened again after completion of the second bale 34b.

Figure 6:
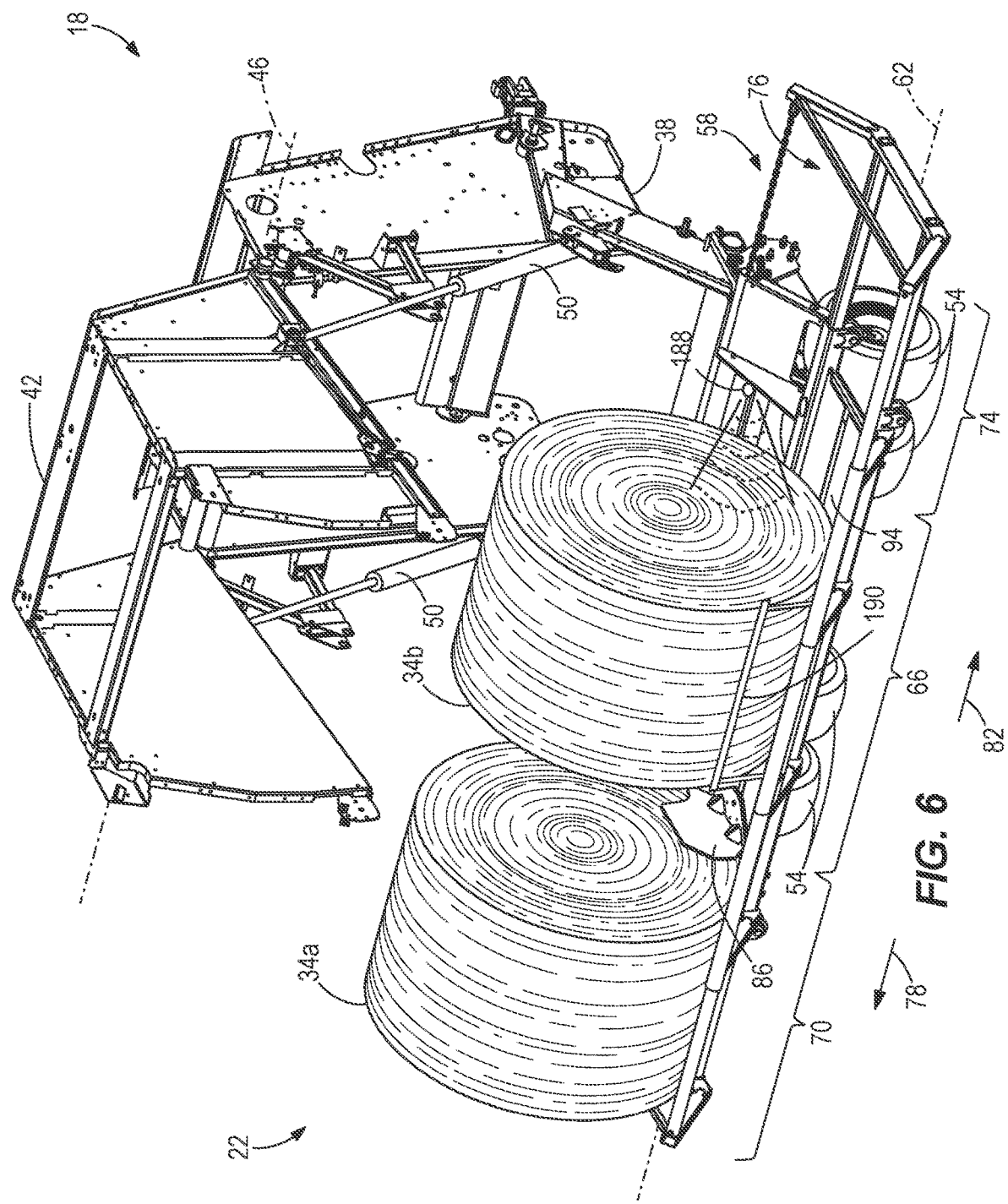
FIG. 6 is a perspective view of the baler and the accumulator with a second crop package located in the middle position on the accumulator.

When the second bale 34b is completed and the operator actuates the OPEN button 138 to command the gate 42 to open, then the configurations of the control system 26 repeat as shown starting in FIGS. 11A-11C except the bale moving member 86 and the crop package actuator 106 are now resting in the left side position instead of the right side position. When the gate 42 opens (FIG. 6), the gate 42 actuates the gate switch 174, which reconfigures the hydraulic circuit 28 for moving the second bale 34b in the second direction 82, e.g., to the right, which is similar to the configuration discussed above with respect to FIGS. 12A-12C. In other implementations, the gate switch 174 may be disposed in any location such that the gate 42 actuates the gate switch 174 on any part of its travel path from closed to open or from open to closed. In yet other implementations, other signals may be used to reconfigure the hydraulic circuit 28 for moving the second bale 34b in the opposite direction, such as a sensor that detects when the bale 34b is completely formed and ready to be released through the gate 42.

Figure 7:
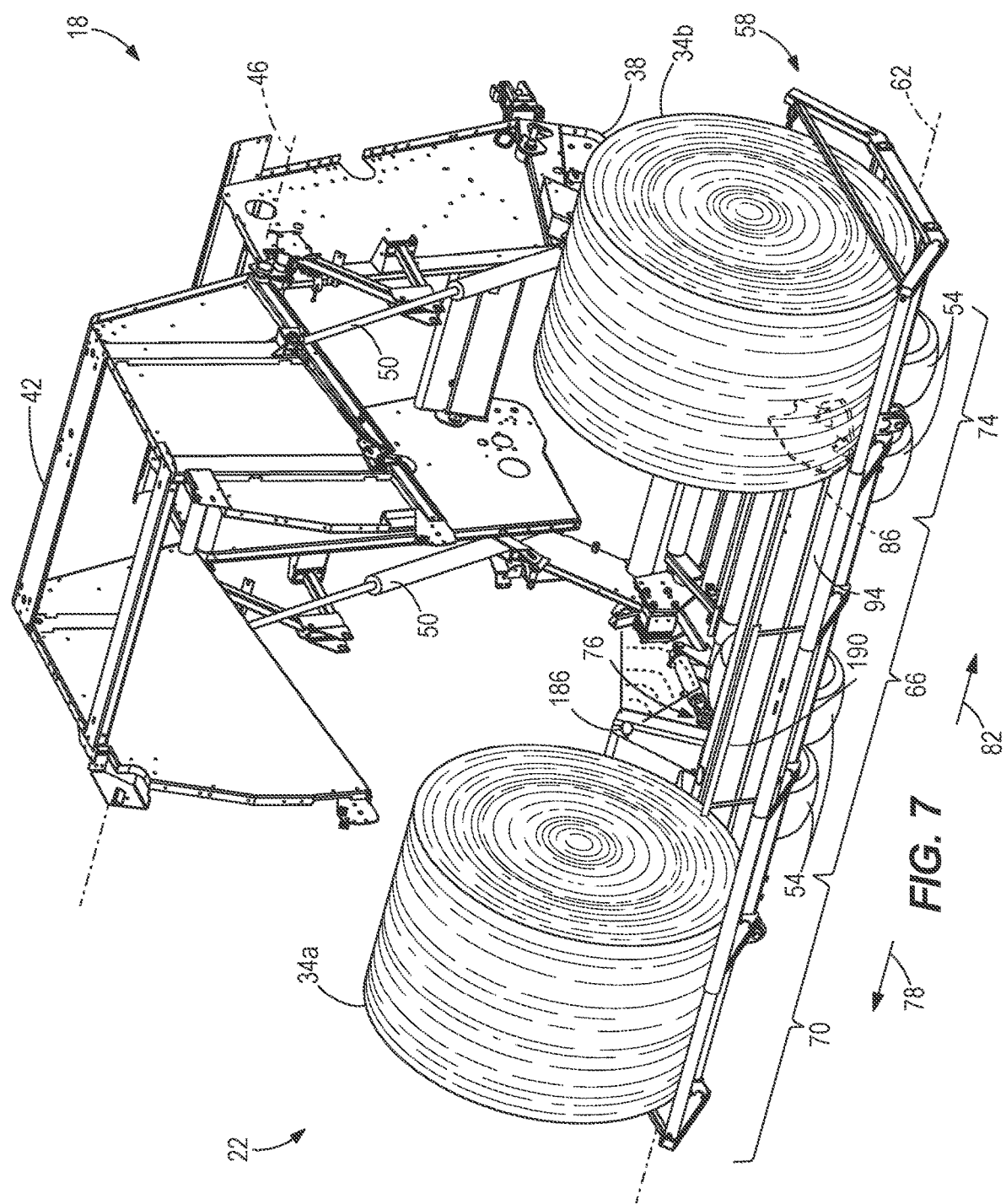
FIG. 7 is a perspective view of the baler and the accumulator with the second crop package located in a second side position on the accumulator.
Figure 8:
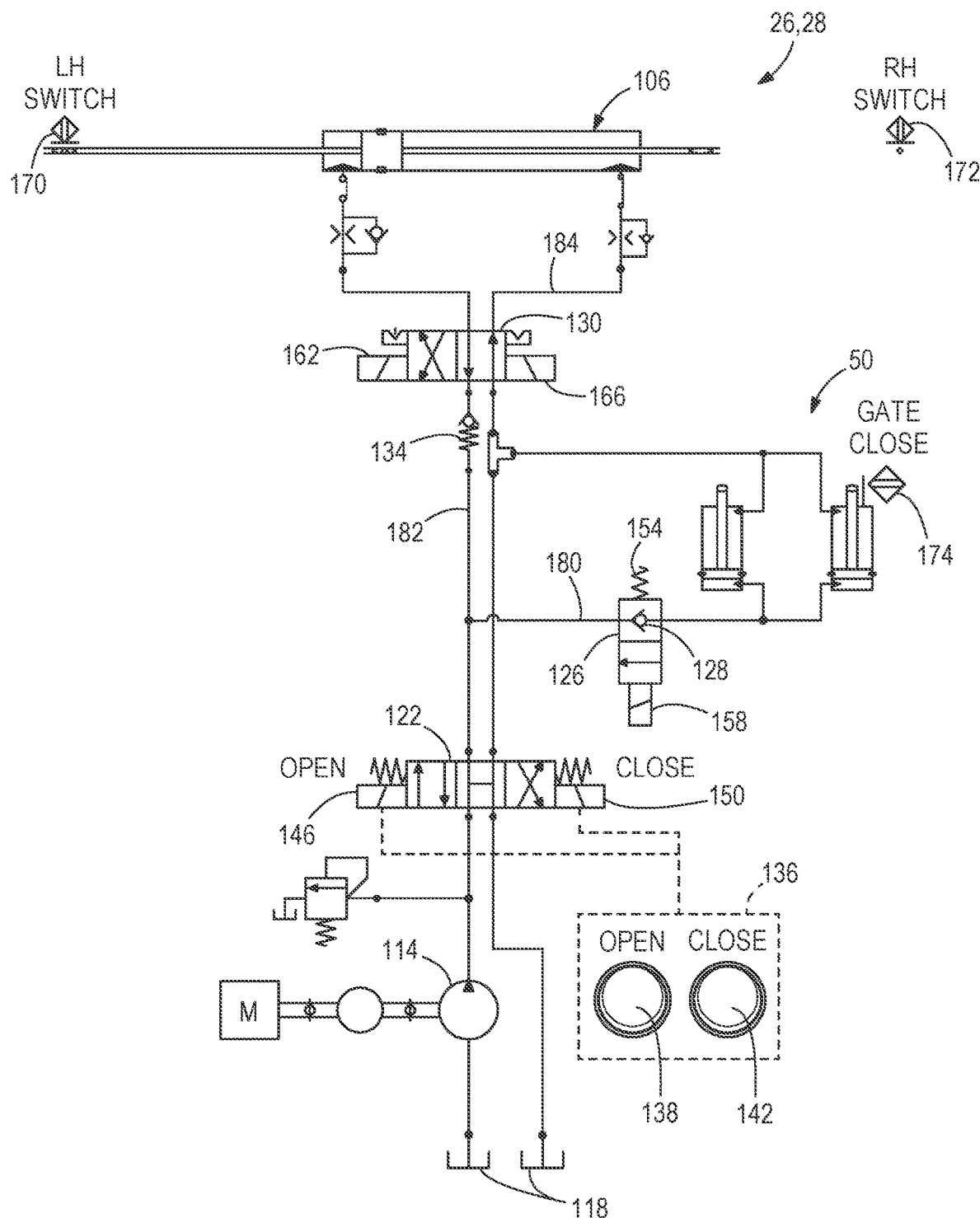
FIG. 8 is a schematic diagram of a hydraulic circuit forming a part of the control system, the hydraulic circuit coupled to the agricultural equipment of FIG. 1 for moving the crop packages to the first side position and to the second side position.

When the operator subsequently actuates the CLOSE button 142 to command the gate 42 to close, the bale moving member 86 slides the second bale 34b in the second direction 82 as shown in FIG. 7. This is comparable to the control system configuration discussed above with respect to FIGS. 13A-13C. When the second bale 34b is out of the way, then the gate 42 can close in a similar manner as discussed above with respect to FIGS. 14A-14C above.

Additionally, the cycle can repeat after the operator drops off the bales 34a, 34b in the field or other location. In other implementations, the control system 26 may move the bales 34a, 34b in the second direction 82 first and thereafter in the first direction 78.

Thus, in a first mode, the bale moving member 86 is movable toward the first accumulation area and, in a second mode, the bale moving member 86 is movable toward the second accumulation area. Actuation of the gate switch 174 by the gate 42 toggles, or switches, the system between the first and second modes. Each time the gate 42 opens (or closes), the mode is switched to reconfigure the bale moving member 86 to be movable in the opposite direction. In other implementations, the mode may be switched in response to any signal from any sensor that is indicative of a point during the forming, releasing, or moving of a bale. Any point during this crop package cycle may act as a cue to switch the direction of bale movement for each bale. For example, a sensor such as the gate switch 174 may be actuated during any point on the opening or closing stroke of the gate 42, or a sensor detecting a point during the forming of the bale (e.g., completion of the bale) may be used as the signal or cue, or a sensor detecting a position of the bale during movement of the bale on the accumulator 22 or detecting a position of the actuator 106 may be used as the signal or cue, etc.

In other implementations, the control system 26 may include a controller (not shown) configured to perform the same functions as, and produce the same result as, the logic in the relay circuit 32 described above. The controller may automatically control the baler 18 and accumulator 22 to achieve the same movements of the gate 42 and the bales 34a, 34b by receiving signals from the sensors 170, 172, 174 (and/or the sensors 186, 188, 190) and sending signals to the solenoids 146, 150, 158, 162, 166 to control the hydraulic valves 122, 126, 130. The controller includes a programmable processor (e.g., a microprocessor, a microcontroller, or another suitable programmable device) and a memory. The memory may include, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The control system 26 may also, or alternatively, include integrated circuits and/or analog devices, e.g., transistors, comparators, operational amplifiers, etc., to execute the logic described in the relay circuit 32, 32' above.

In yet another implementation, the control system 26 controller may have a program or algorithm written to execute the logic without the use of sensors, e.g., programmed to perform a sequence of operations without regard for bale presence or absence. An example of such an algorithm is illustrated in the flow chart of FIG. 16A and, as an alternative, FIG. 16B.

Figure 16A:
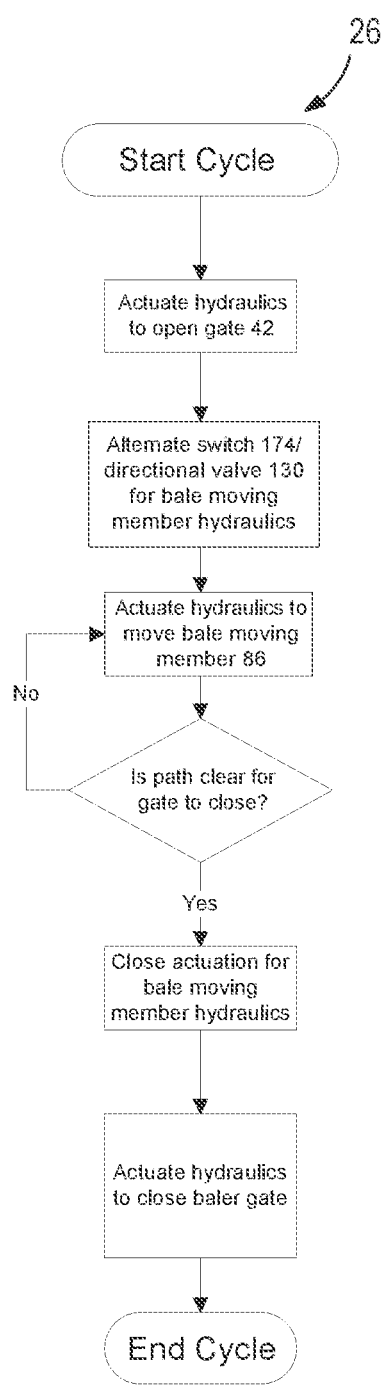
FIG. 16A is a flow chart illustrating a method of the invention.
Figure 16B:
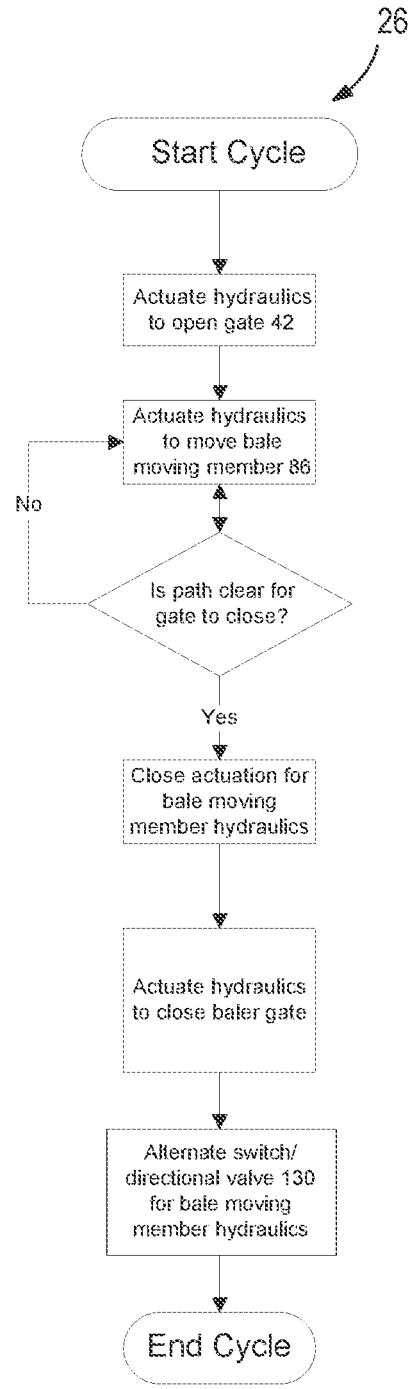
FIG. 16B is a flow chart illustrating an alternative method to FIG. 16A.

FIG. 16A illustrates a control algorithm that starts with actuating the hydraulic circuit 28 to open the gate 42 (as described above), then alternating, or toggling, the gate switch 174 to move the directional valve 130 such that the bale moving member 86 is ready to switch directions (as described above), then actuating the hydraulic circuit 28 to move the bale moving member 86 (as described above), and then checking whether the path is clear for the gate 42 to close. Checking whether the path is clear may employ any one or more of the sensors or switches discussed above, or may include a timer or other means that does not depend on the bale itself. If the path is not clear, then the system continues to actuate the hydraulic circuit 28 to move the bale moving member 86 (as described above). When the path is clear, the system closes, or stops, movement of the bale moving member 86 by closing actuation of the hydraulic circuit 28 (as described above), and then actuates the hydraulic circuit 28 to close the gate 42 (as described above). Alternatively, as illustrated in FIG. 16B, the step of alternating, or toggling, the gate switch 174 to move the directional valve 130 such that the bale moving member 86 is ready to switch directions can be performed at the end of the sequence. Furthermore, the step of alternating, or toggling, the gate switch 174 to move the directional valve 130 such that the bale moving member 86 is ready to switch directions can be performed anywhere in the baling cycle and may be triggered by any event that occurs at a predetermined point in the baling cycle (e.g., bale ejected from chamber, gate closed, slide of bale sideways, etc.). This step could also be programmed to occur in response to recognition of a particular point in the cycle (e.g., beginning end, or any point therebetween) without connection to a particular event.

The flow charts of FIGS. 16A and 16B also generally describe the steps accomplished by the mechanical system of FIGS. 8-15C described above, e.g., a method describing the disclosure above.

The control system 26 may allow the operator to select a single-direction mode, or input a single direction (e.g., left or right) in which to push the bale. The control system may include an interface, such as a graphical user interface, to allow user input of modes and/or directions. In this implementation, the bale moving member 86 is reset to one side after each bale movement such that bales are only pushed in one direction on the accumulator 22. For example, the control system 26 can be programmed to move the bale moving member 86 back to its previous position after each bale-pushing stroke is completed and before a subsequent bale is released to the accumulator 22. The control system 26 may also include a mode in which the bale is not moved on the accumulator 22.

Thus, the disclosure provides, among other things, a baling system including a baler 18, an accumulator 22, and a control system 26 for moving bales into storage on the accumulator 22 laterally in an alternating fashion and for timing the closing of the gate 42 therewith. Various features and advantages of the invention are set forth in the following claims.

What is claimed is:

1. A baling system comprising:
   a baler configured to execute a baling cycle to form a bale of crop material, the baler including a gate configured to move between a closed position and an open position;
   an accumulator coupled to the baler and having a frame defining a receiving area configured to receive the bale from the baler when the gate is in the open position, the frame further defining a first accumulation area laterally offset from the receiving area to a first side of the baler and configured to support the bale, and a second accumulation area laterally offset from the receiving area to a second side of the baler and configured to support the bale, wherein the receiving area, the first accumulation area, and the second accumulation area are located on a respective first surface, second surface, and third surface of the accumulator, and wherein the first surface is located in between the second and third surfaces of the accumulator;
   a hydraulic circuit having a first configuration and a second configuration; and
   an actuator operatively coupled with the hydraulic circuit, the actuator configured to selectively direct the bale from the receiving area toward the first accumulation area when the hydraulic circuit is disposed in the first configuration and toward the second accumulation area when the hydraulic circuit is disposed in the second configuration;
   wherein a hydraulic valve is moved during the baling cycle to alternate the hydraulic circuit between the first configuration and the second configuration.

2. The baling system of claim 1, wherein the hydraulic valve is moved by a switch.

3. The baling system of claim 2, wherein the switch is movable between a first switch position and a second switch position, wherein the switch alternates between the first switch position and the second switch position upon each gate opening.

4. The baling system of claim 1, wherein the hydraulic valve is moved by a controller being triggered by an event during the baling cycle.

5. The baling system of claim 4, wherein the hydraulic circuit includes a directional valve configured to selectively direct a hydraulic fluid to move the actuator toward the first accumulation area in a first slider position or toward the second accumulation area in a second slider position, wherein in the first switch position the switch effectuates movement of the valve to the first slider position and in the second switch position the switch effectuates movement of the slider directional valve to the second slider position.

6. The baling system of claim 1, wherein the hydraulic circuit includes a directional valve configured to selectively direct a hydraulic fluid to move the actuator toward the first accumulation area in a first slider position or toward the second accumulation area in a second slider position, wherein actuation of the switch by the gate switches the directional valve between the first slider position and the second slider position.

7. The baling system of claim 1, wherein the first accumulation area is disposed laterally with respect to a direction in which the bale is configured to enter the receiving area, and wherein the second accumulation area is disposed laterally with respect to the direction and opposite the first accumulation area.

8. The baling system of claim 7, wherein the hydraulic circuit includes a gate valve operatively coupled to the gate and movable between a first position and a second position, wherein in the first position the gate valve is configured to inhibit the gate from closing, wherein in the second position the gate valve allows the gate to move to the closed position, and wherein the gate valve moves to the second position in response to the actuator moving the predetermined distance.

9. The baling system of claim 1, wherein the gate is inhibited from closing until the actuator has moved a predetermined distance for directing the bale away from the receiving area.

10. The baling system of claim 9, further comprising a position sensor configured to detect when the actuator has moved the predetermined distance and to transmit a signal for moving the gate valve to the second position when movement of the actuator through the predetermined distance is detected.

11. A baling system comprising:
a baler configured to form a package of crop material, the baler including a gate configured to move between a closed position and an open position;
an accumulator coupled to the baler and having a frame defining a receiving area configured to receive the crop package through the gate when the gate is in the open position, the frame further defining a first accumulation area laterally offset from the receiving area to a first side of the baler and configured to support a crop package, and a second accumulation area laterally offset from the receiving area to a second side of the baler and configured to support a crop package, wherein the receiving area, the first accumulation area, and the second accumulation area are located on a respective first surface, second surface, and third surface of the accumulator, wherein the first surface is located in between the second and third surfaces of the accumulator; and
a crop package moving member configured to direct the crop package from the receiving area selectively toward the first accumulation area in a first mode and toward the second accumulation area in a second mode;
in the first mode, the crop package moving member is movable toward the first accumulation area and, in the second mode, the crop package moving member is movable toward the second accumulation area;
wherein the system is configured to be switchable between the first and second modes at least once during a crop package cycle.

12. The baling system of claim 11, further comprising a sensor configured to generate a signal during the cycle, wherein the system is configured to switch between the first and second modes in response to the signal from the sensor.

13. The baling system of claim 11, wherein the crop package cycle is defined by the forming, the receiving, and the directing of the package of crop material.

14. The baling system of claim 11, further comprising a sensor operative to generate a signal to switch the system between the first and second modes.

15. The baling system of claim 11, further comprising a sensor configured to detect a predetermined position of the gate, wherein the system is configured to switch between the first and second modes in response to the sensor detecting the predetermined position of the gate.

16. The baling system of claim 11, wherein during movement of the crop package moving member toward either the first accumulation area or the second accumulation area, the gate is inhibited, by way of blocked power flow to a gate actuator, from moving to the closed position.

17. A baling system comprising:
a baler configured to form a package of crop material, the baler including a gate configured to move between a closed position and an open position;
an accumulator coupled to the baler and having a frame defining a receiving area configured to receive the crop package from the baler when the gate is in the open position and the frame further defining an accumulation area laterally offset from the receiving area, the accumulation area configured for supporting the crop package clear of the gate during gate movement, wherein the receiving area and the accumulation area are located on a respective first surface and second surface of the accumulator; and
an actuator movable through a stroke to direct the crop package laterally toward the accumulation area;
wherein the gate is inhibited, by way of blocked power flow to a gate actuator, from closing until the crop package has reached a position clear of the path of the gate closing.

18. The baling system of claim 17, wherein the position is determined in response to the actuator being moved through the stroke a predetermined distance.

19. The baling system of claim 17, wherein the position is determined in response to a sensor indicating that the crop package has reached the position clear of the path of the gate.

20. The baling system of claim 17, wherein the gate is configured to automatically close in response to the actuator completing the stroke.

21. The baling system of claim 20, wherein the hydraulic circuit includes a gate valve movable between a first position and a second position, wherein in the first position the gate valve is configured to inhibit the gate from closing, wherein in the second position the gate valve allows the gate to move to the closed position, and wherein the gate valve moves to the second position in response to the actuator completing the stroke.

22. The baling system of claim 17, further comprising a hydraulic circuit operable to drive the gate to the open position and operable to drive the actuator through the stroke.

23. The baling system of claim 22, further comprising a position sensor configured to detect completion of the stroke and to transmit a signal for moving the gate valve to the second position when completion of the stroke is detected.

24. The baling system of claim 23, wherein the accumulation area is a first accumulation area, the accumulator further having a second accumulation area disposed laterally with respect to the direction in which the crop package is configured to enter the receiving area and opposite the first accumulation area.

25. The baling system of claim 17, wherein the accumulation area is disposed laterally with respect to a direction in which the crop package enters the receiving area.

26. The baling system of claim 25, wherein the stroke of the actuator is selectively movable in a first direction toward the first accumulation area and in a second direction toward the second accumulation area, the baling system further comprising a switch configured to be actuated by the gate upon reaching the open position, wherein actuation of the switch by the gate in the open position effectuates a change in the direction of the stroke of the actuator.

27. The baling system of claim 17, further comprising a switch configured to be actuated by the gate upon reaching the open position, wherein actuation of the switch by the gate in the open position effectuates a change in direction of the stroke of the actuator.

* * * * *